(12) United States Patent
Wang et al.

(10) Patent No.: US 11,017,587 B2
(45) Date of Patent: May 25, 2021

(54) IMAGE GENERATION METHOD AND IMAGE GENERATION DEVICE

(71) Applicant: Panasonic Intellectual Property Corporation of America, Torrance, CA (US)

(72) Inventors: Chi Wang, Singapore (SG); Pongsak Lasang, Singapore (SG); Toshiyasu Sugio, Osaka (JP); Toru Matsunobu, Osaka (JP); Satoshi Yoshikawa, Hyogo (JP); Tatsuya Koyama, Kyoto (JP); Yoichi Sugino, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/807,355

(22) Filed: Mar. 3, 2020

(65) Prior Publication Data

US 2020/0202611 A1    Jun. 25, 2020

Related U.S. Application Data

(63) Continuation of application No. PCT/JP2018/033518, filed on Sep. 10, 2018.
(Continued)

(51) Int. Cl.
*G06T 15/20* (2011.01)
*H04N 13/128* (2018.01)
(Continued)

(52) U.S. Cl.
CPC ............ *G06T 15/205* (2013.01); *G06T 15/04* (2013.01); *H04N 13/117* (2018.05); *H04N 13/128* (2018.05); *H04N 13/15* (2018.05)

(58) Field of Classification Search
CPC ..... G06T 15/205; G06T 15/04; H04N 13/128; H04N 13/15; H04N 13/117
See application file for complete search history.

(56) References Cited

U.S. PATENT DOCUMENTS

| 8,384,715 B2 | 2/2013 | Loop et al. |
| 9,418,486 B2 | 8/2016 | Cho et al. |

(Continued)

FOREIGN PATENT DOCUMENTS

| JP | 10-208074 | 8/1998 |
| JP | 2015-45920 | 3/2015 |

OTHER PUBLICATIONS

International Search Report dated Nov. 27, 2018 in International (PCT) Application No. PCT/JP2018/033518.

*Primary Examiner* — Chong Wu
(74) *Attorney, Agent, or Firm* — Wenderoth, Lind & Ponack, L.L.P.

(57) ABSTRACT

This image generation method is for generating a virtual image by a processor using at least one of images obtained by cameras disposed in different positions and attitudes capturing the same target space in a three-dimensional (3D) space. The virtual image is a two-dimensional (2D) image of the target space viewed from a virtual viewpoint in the 3D space. When generating the virtual image using one or more second images captured by one or more second cameras, at least one of which is different from one or more first cameras that capture one or more first images serving as a basis among the images, a second process which includes at least one of luminance and color adjustments and is different from a first process performed to generate the virtual image using the one or more first images is performed on the one or more second images.

6 Claims, 15 Drawing Sheets

Related U.S. Application Data

(60) Provisional application No. 62/556,726, filed on Sep. 11, 2017.

(51) Int. Cl.
  *H04N 13/15* (2018.01)
  *H04N 13/117* (2018.01)
  *G06T 15/04* (2011.01)

(56) References Cited

U.S. PATENT DOCUMENTS

2018/0174331 A1* 6/2018 Pham .................. G06T 7/90
2019/0228565 A1* 7/2019 Yushiya ................ G06T 19/00

* cited by examiner

FIG. 1

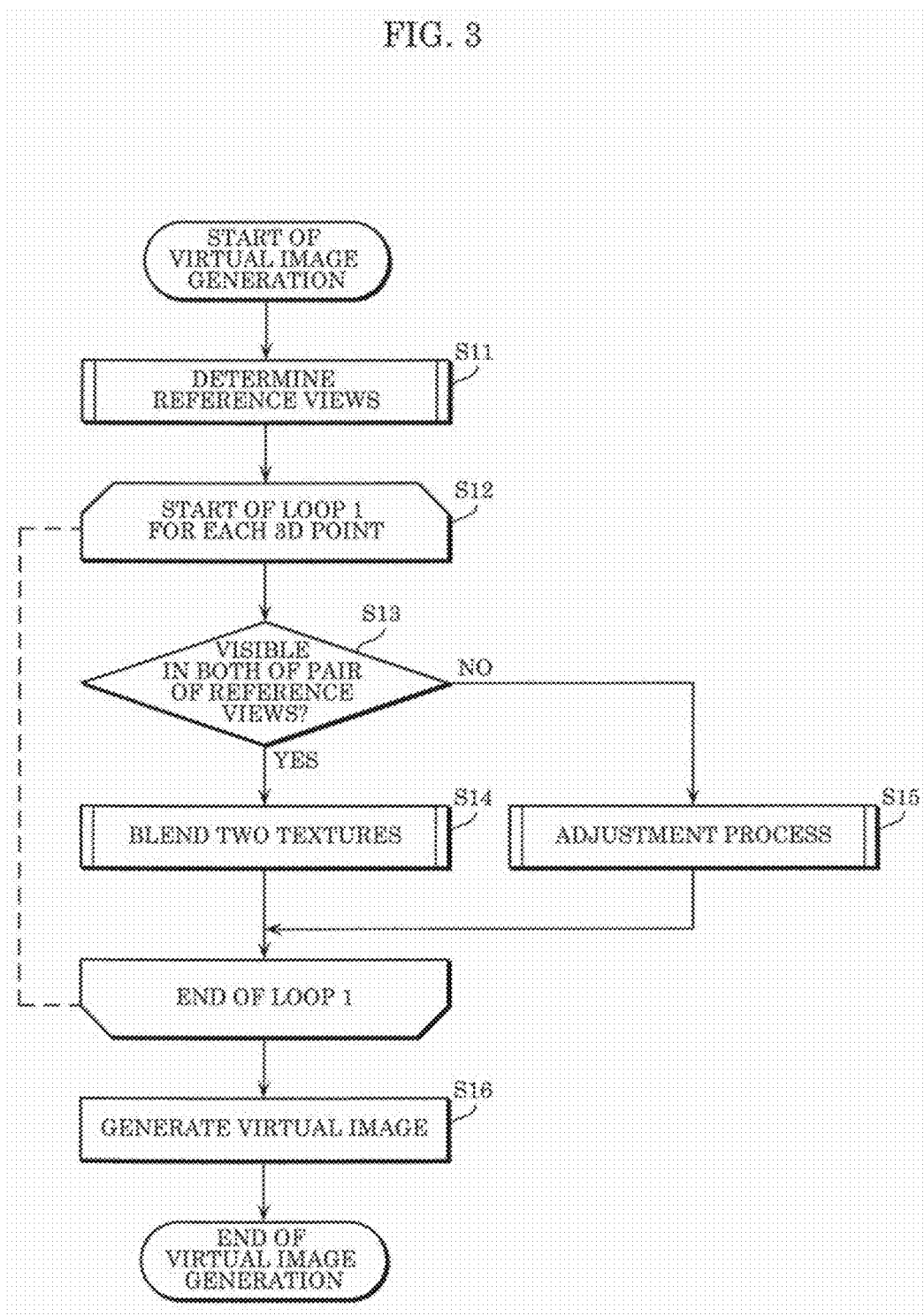

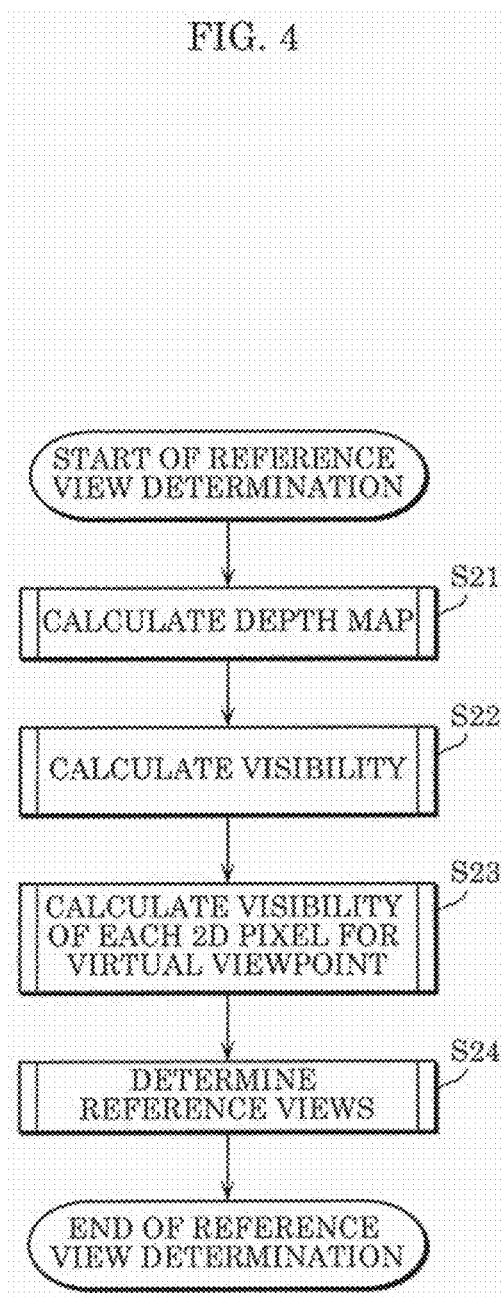

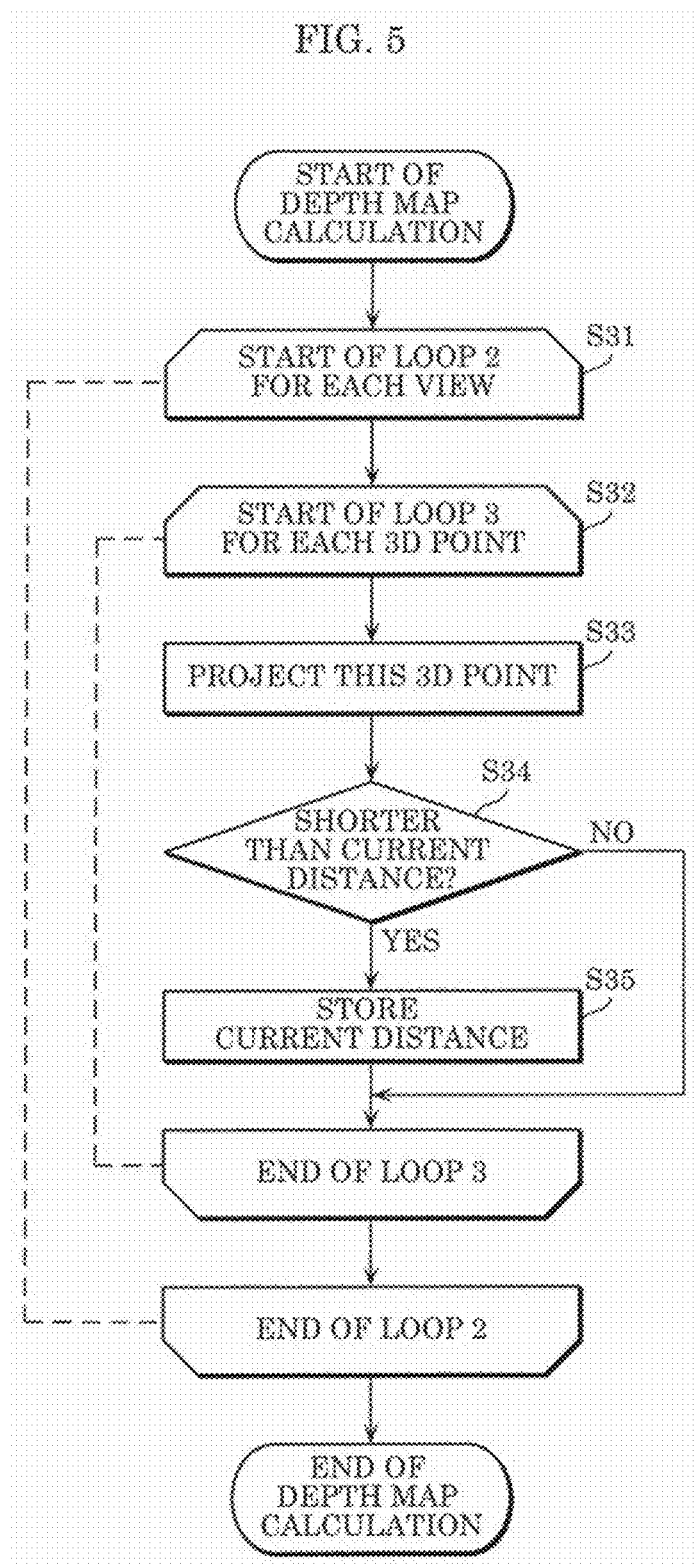

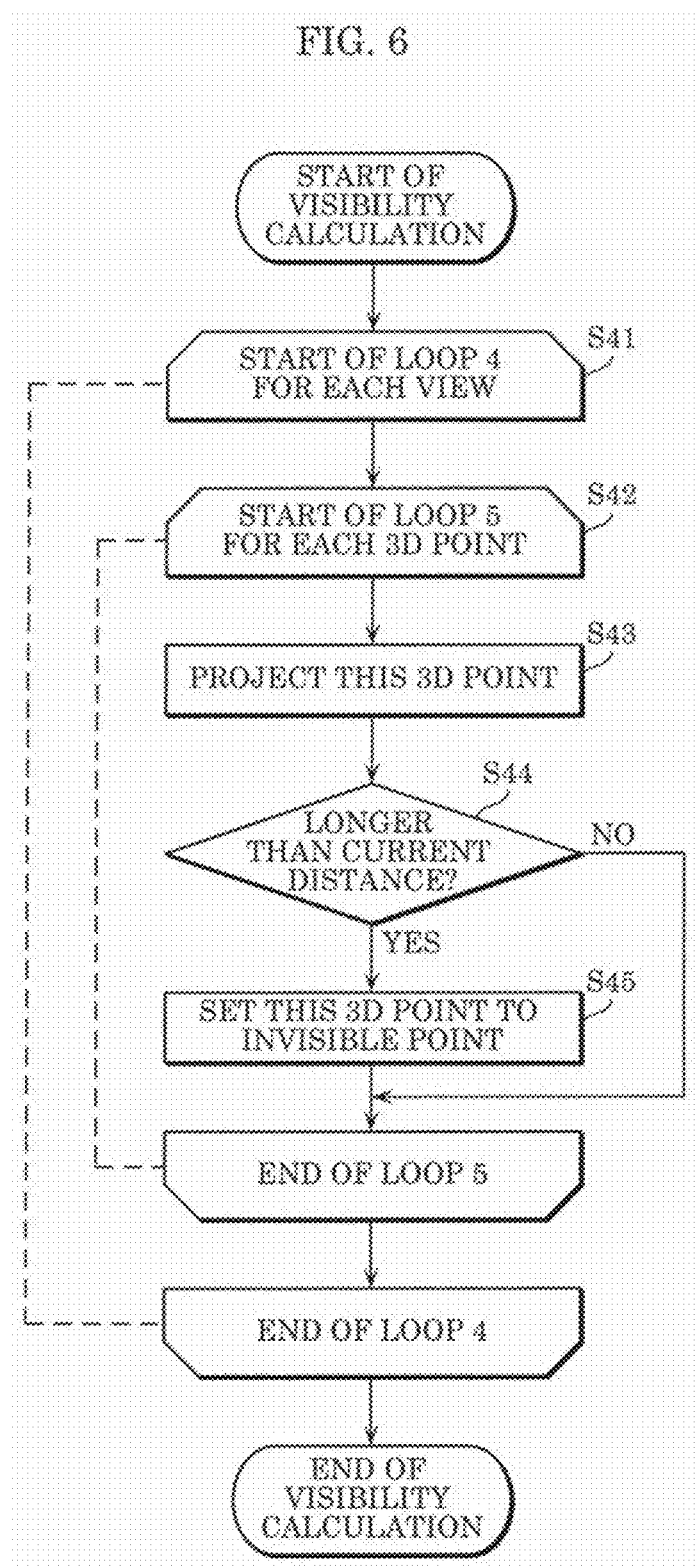

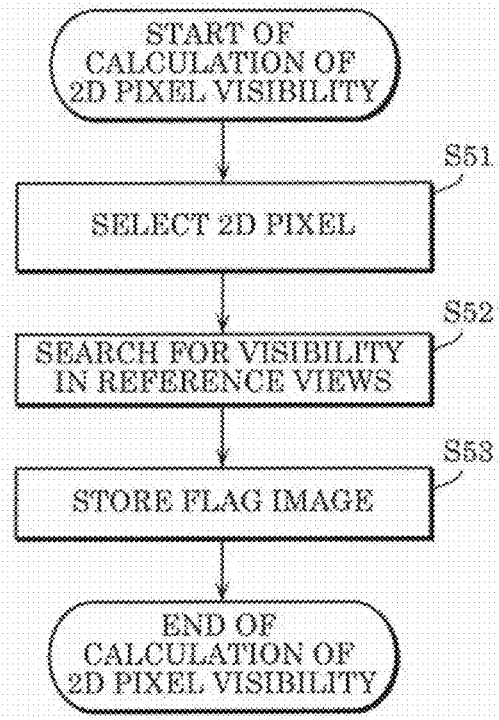
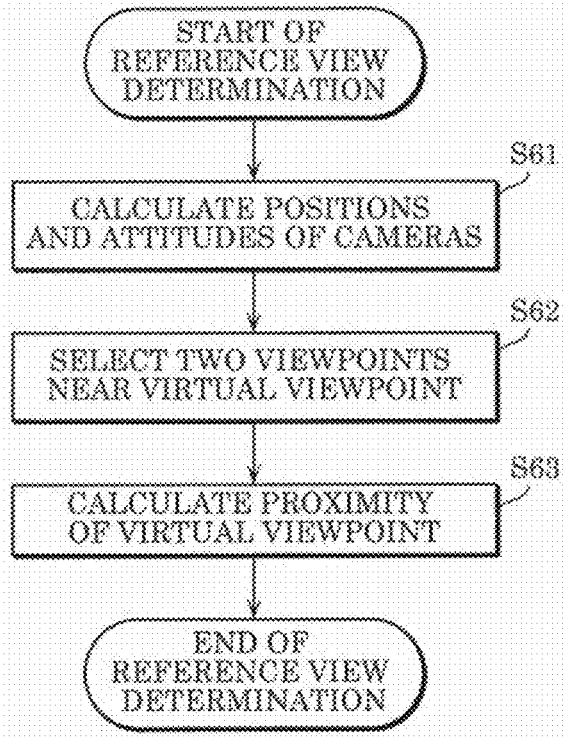

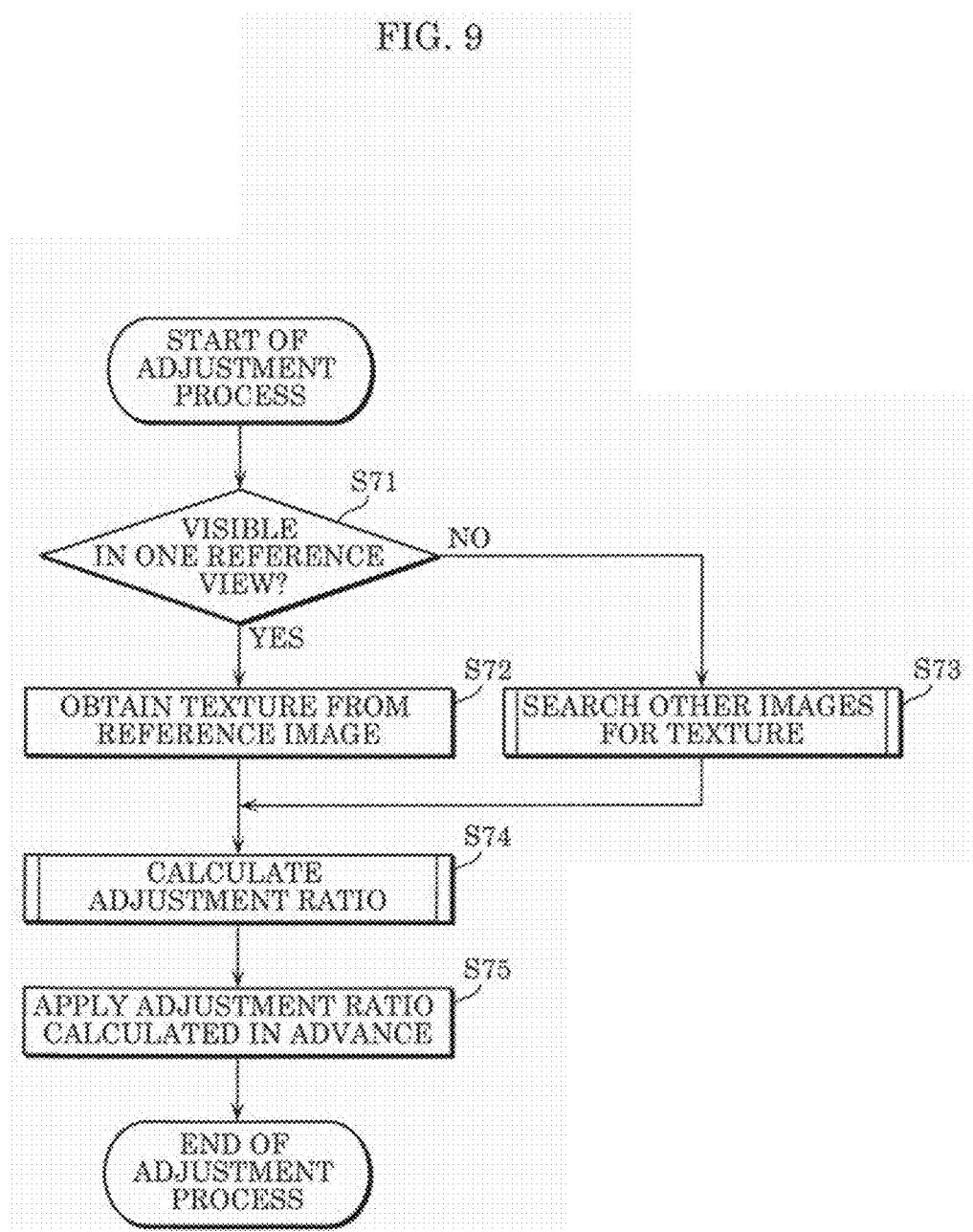

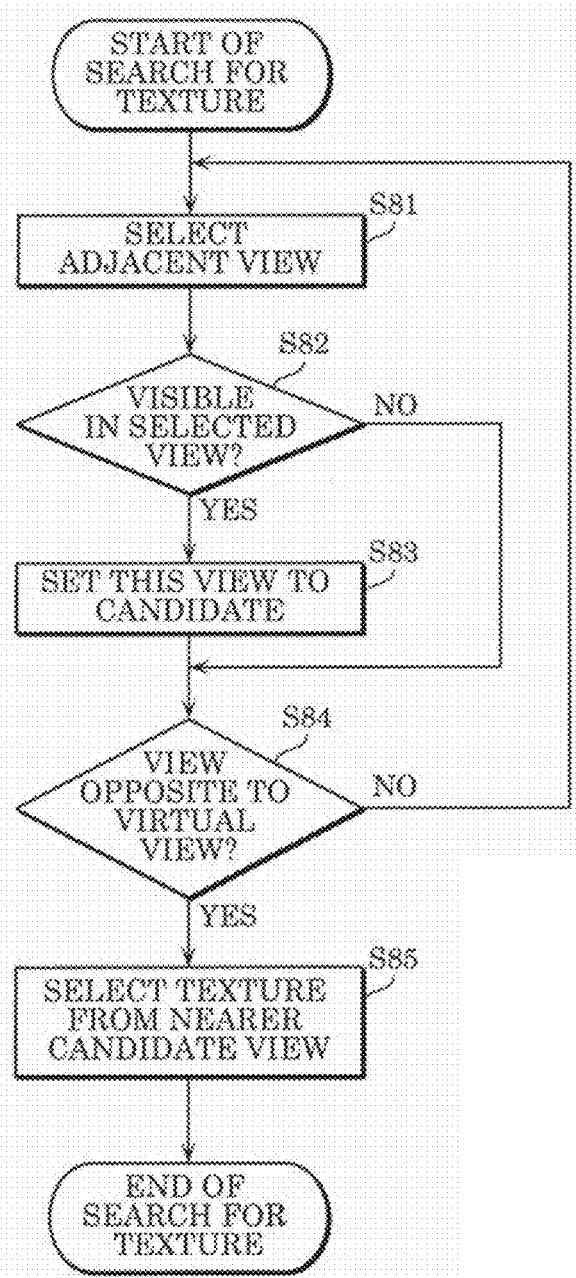

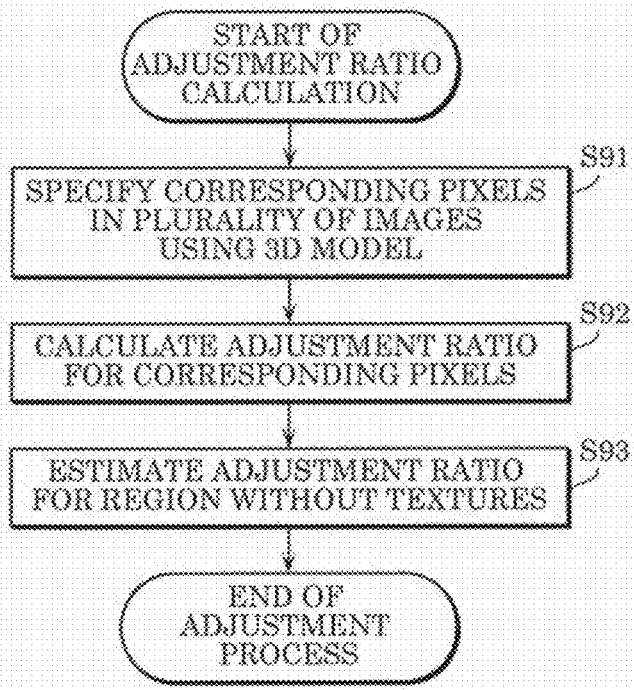
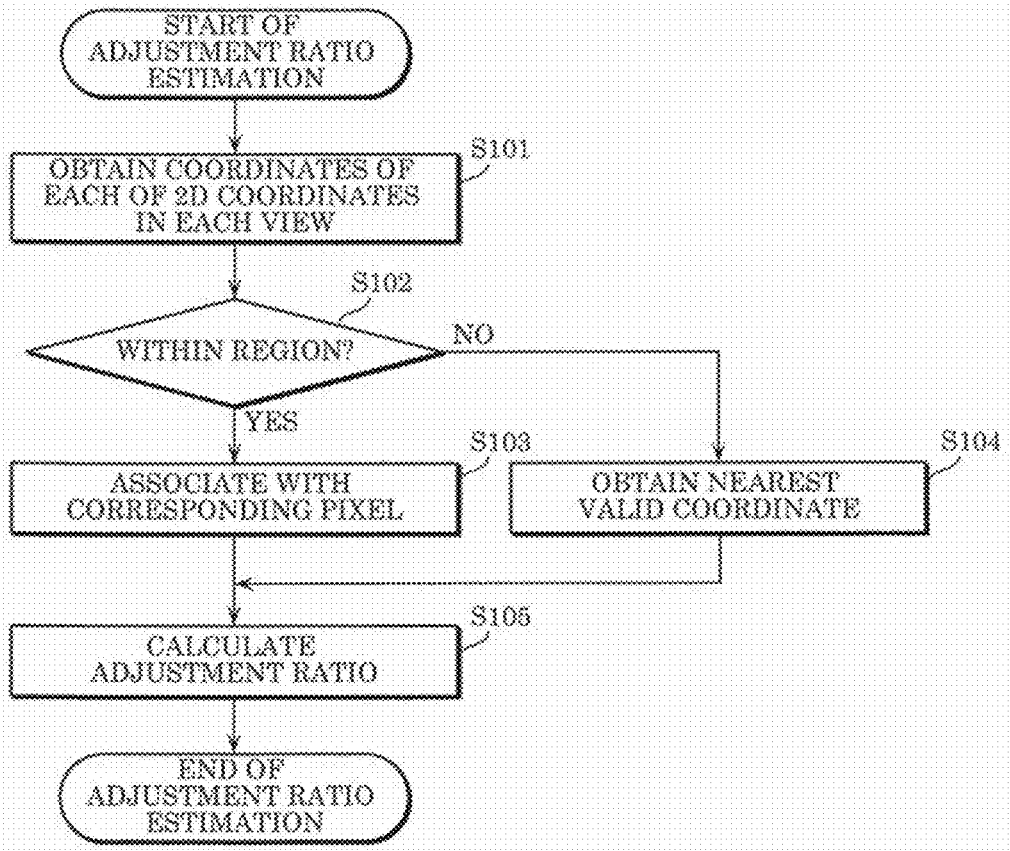

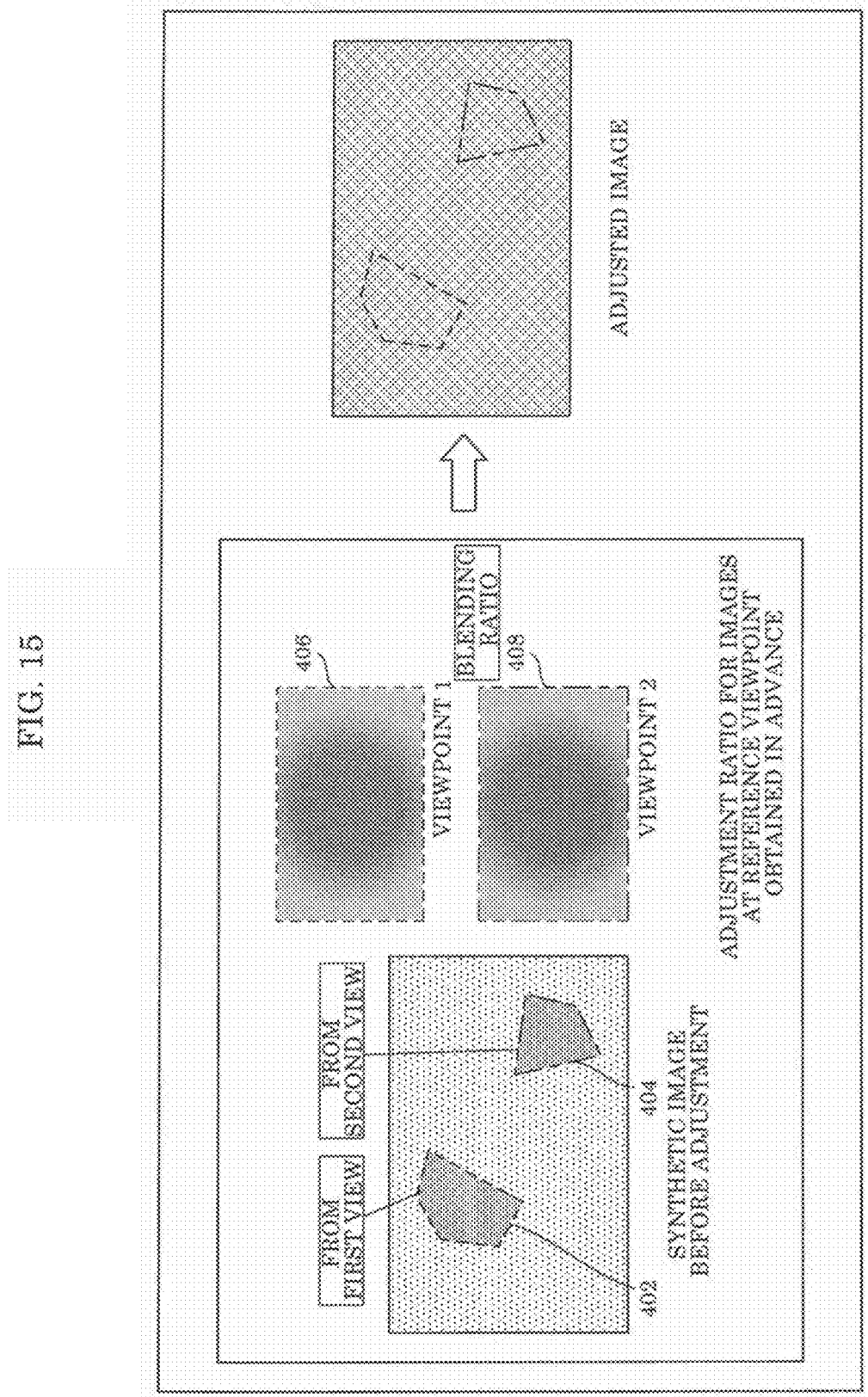

IMAGE GENERATION METHOD AND IMAGE GENERATION DEVICE

CROSS REFERENCE TO RELATED APPLICATIONS

This application is a U.S. continuation application of PCT International Patent Application Number PCT/JP2018/033518 filed on Sep. 10, 2018, claiming the benefit of priority of U.S. Provisional Patent Application No. 62/556,726 filed on Sep. 11, 2017, the entire contents of which are hereby incorporated by reference.

BACKGROUND

1. Technical Field

The present disclosure relates to image generation methods and image generation devices.

2. Description of the Related Art

U.S. Pat. No. 8,384,715 B2 (Patent Literature 1) discloses a view-dependent rendering technique for rendering views of parametric surfaces of a three-dimensional (3D) object. The rendering technique includes converting a set of parametric surface patches representing a surface into a view-dependent, polygonal approximation of the surface.

U.S. Pat. No. 9,418,486 B2 (Patent Literature 2) discloses a method and apparatus for generating a multi-view image which includes: determining an input image for generating multi-view images; and selecting all stereo images or one of stereo images to be used as an input image on the basis of the presence of distortion between the stereo images. In the method and apparatus, the viewpoint of the generated image is different from the viewpoint of the input stereo image.

SUMMARY

An image generation method according to one aspect of the present disclosure is an image generation method for generating a virtual image by a processor using at least one image among a plurality of images obtained by a plurality of cameras disposed in different positions and attitudes capturing a same target space in a three-dimensional (3D) space. The virtual image is a two-dimensional (2D) image of the target space viewed from a virtual viewpoint in the 3D space. The image generation method includes receiving one or more second images from the plurality of cameras. The image generation method includes performing a second process on the one or more second images to generate the virtual image when generating the virtual image using the one or more second images. The second process includes at least one of luminance adjustment or color adjustment and is different from a first process performed to generate the virtual image using one or more first images serving as a basis among the plurality of images. The one or more second images are captured by one or more second cameras, at least one of which is different from one or more first cameras that capture the one or more first images.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1 is a block diagram illustrating an example of the configuration of an image generation system according to Embodiment 1;

FIG. 3 is a flowchart illustrating an example of the process of generating a virtual image by an image generation system according to Embodiment 1;

FIG. 4 is a flowchart illustrating an example of the process of calculating visibility by a rendering module;

FIG. 5 is a flowchart illustrating an example of the process of calculating a depth map;

FIG. 6 is a flowchart illustrating an example of the process of calculating visibility;

FIG. 7 is a flowchart illustrating an example of the process of calculating two-dimensional (2D) pixel visibility;

FIG. 8 is a flowchart illustrating an example of the process of determining reference views;

FIG. 9 is a flowchart illustrating an example of an adjustment process;

FIG. 10 is a flowchart illustrating the process of searching for a texture by changing a view to two directions starting from a pair of reference views;

FIG. 13 is a flowchart illustrating an example of the process of calculating an adjustment ratio;

FIG. 14 is a flowchart illustrating an example of the process of estimating an adjustment ratio;

FIG. 15 is a diagram for describing an adjustment process in which an adjustment ratio obtained from two views is used;

Figure 2:
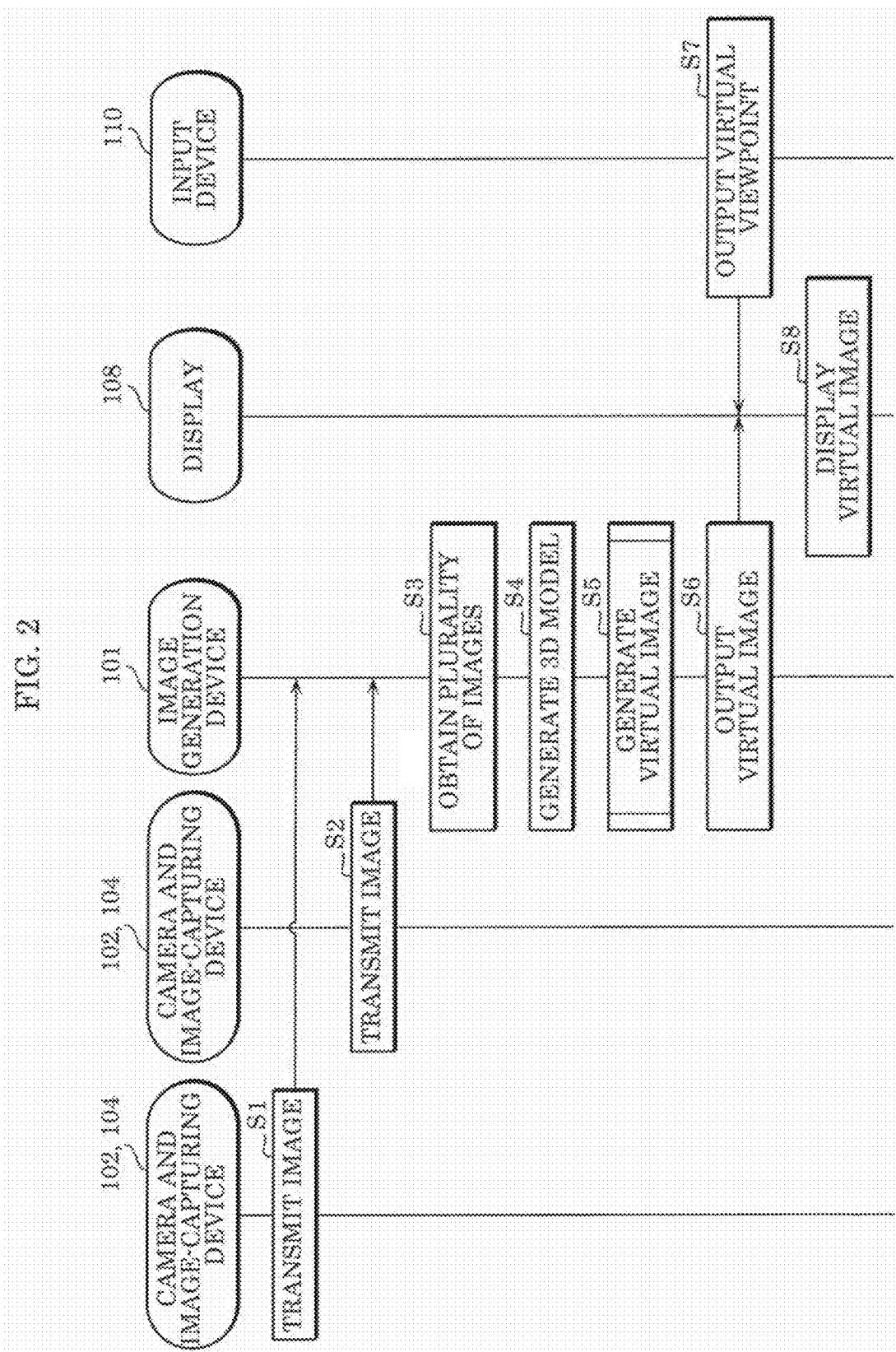
FIG. 2 is a sequence diagram illustrating an example of operations performed by an image generation system according to Embodiment 1.

DETAILED DESCRIPTION OF THE EMBODIMENTS (Underlying Knowledge Forming Basis of the Present Disclosure)

Virtual image synthesis, which is synthesis for a novel view image, is the process of generating, from an input image and a corresponding 3D model or a depth map which is an image having information of the distance from a viewpoint in which each pixel is located, a virtual image that is expected to be seen when a 3D object is seen from a virtual viewpoint. This process is view-dependent synthesis. Note that the view represents a viewpoint or a field of view. The virtual image can be generated using a 3D model of a 3D object and a texture image which is a captured image of the 3D object. For example, the virtual image may be displayed as multi-view 3D display or single-view 2D display with a changing viewpoint directed by a user. More specifically, in the view-dependent synthesis, a virtual image is generated using images from specific viewing directions.

In such virtual image synthesis, when a plurality of images in a plurality of views captured by a plurality of different cameras are a plurality of input images, a 3D model is typically used as a proxy for attaching textures from the plurality of input images. In the aforementioned conventional methods, a texture obtained from an input image is combined into a virtual image. However, in the conventional methods, the colors of a plurality of input images obtained by a plurality of different cameras are not properly corrected according to the plurality of cameras. Therefore, if a view angle changes, the color of some materials changes drastically. For example, there are cases where a difference in luminance or color or occurs between regions that are to be seen with approximately the same level of luminance or color depending on whether or not the regions are included in the input image among a plurality of regions in a virtual image. Thus, a difference in luminance or color that would not be seen when a 3D model is seen from a novel virtual viewpoint may occur in a virtual image, meaning that there is a possibility of causing a feeling of visual discomfort for users.

Thus, an image generation method according to one aspect of the present disclosure is an image generation method for generating a virtual image by a processor using at least one image among a plurality of images obtained by a plurality of cameras disposed in different positions and attitudes capturing a same target space in a three-dimensional (3D) space. The virtual image is a two-dimensional (2D) image of the target space viewed from a virtual viewpoint in the 3D space. The image generation method includes receiving one or more second images from the plurality of cameras. The image generation method includes performing a second process on the one or more second images to generate the virtual image when generating the virtual image using the one or more second images. The second process includes at least one of luminance adjustment or color adjustment and is different from a first process performed to generate the virtual image using one or more first images serving as a basis among the plurality of images. The one or more second images are captured by one or more second cameras, at least one of which is different from one or more first cameras that capture the one or more first images.

Thus, in the case of generating a virtual image using one or more second images, the second process which is different from the first process performed to generate a virtual image using one or more first images and includes at least one of luminance adjustment and color adjustment is performed on the one or more second images; therefore, the likelihood of a difference in luminance or color occurring between the plurality of regions in the virtual image can be reduced. As a result, it is possible to reduce visual discomfort that may be felt by users.

Furthermore, the generating of the virtual image may include: generating a first region of the virtual image by performing the first process on the one or more first images; and generating a second region, which does not overlap the first region, of the virtual image by performing the second process on the one or more second images.

Thus, the likelihood of a difference in luminance or color occurring between the plurality of regions in the virtual image can be reduced. As a result, it is possible to reduce visual discomfort that may be felt by users.

Furthermore, the generating of the virtual image may further include: obtaining a 3D model of the target space; selecting a plurality of candidate points for generating the virtual image from among a plurality of 3D points constituting the 3D model; and extracting, from the plurality of cameras, cameras that capture respective ones of the plurality of candidate points. In the generating of the first region, when all of the one or more first cameras are included in the cameras extracted for the respective ones of the plurality of candidate points, the first process may be performed on regions of the one or more first images that correspond to the plurality of candidate points, to generate the first region of the virtual image that correspond to the plurality of candidate points. In the generating of the second region, when at least one of the one or more first cameras is not included in the cameras extracted for the respective ones of the plurality of candidate points, the second process may be performed on pixels, which correspond to the plurality of candidate points, of the one or more second images captured by the one or more second cameras included in the cameras extracted, to generate the second region of the virtual image that correspond to the plurality of candidate points.

Thus, when the cameras that have captured the plurality of images to be used to generate the virtual image have different configurations, at least one of different luminance adjustment and different color adjustment is performed; therefore, the likelihood of a difference in luminance or color occurring between the plurality of regions in the virtual image can be reduced.

Furthermore, the same target space may include a flat face, and each of the one or more first images and the one or more second images may include an image of the flat face. In the first process, a region of the virtual image that corresponds to the flat face may be generated by projective transformation of the one or more first images, and in the second process, a region of the virtual image that corresponds to the flat face may be generated by projective transformation of the one or more second images.

Thus, also in the case of generating a virtual image by combining the first and second images each including an image of a flat face by projective transformation, the second process including at least one of the luminance adjustment and the color adjustment is performed on the one or more second images; therefore, the likelihood of a difference in luminance or color occurring between the plurality of regions in the virtual image can be reduced. As a result, it is possible to reduce visual discomfort that may be felt by users.

Furthermore, the one or more first cameras may be two cameras located nearest to the virtual viewpoint among the plurality of cameras.

Thus, the image captured in the nearest view from the virtual viewpoint can be used to generate the virtual image.

Furthermore, the one or more first cameras may be two or more first cameras, the first process may include a process of blending, at a predetermined blending ratio, at least one of luminance or colors of two or more first images captured by the two or more first cameras, and the second process may include a process of performing at least one of the luminance adjustment or the color adjustment to obtain one of luminance and a color that is similar to a corresponding one of luminance and a color obtained by the process of blending, using a difference in at least one of luminance or a color obtained by comparing two or more first background images obtained by the two or more first cameras and one or more second background images obtained by the one or more second cameras.

Thus, the likelihood of a difference in luminance or color occurring between the plurality of regions in the virtual image can be effectively reduced.

Note that the aforementioned general or specific aspects may be implemented using a device, a system, an integrated circuit, a computer program, or a computer-readable recording medium such as a CD-ROM, or any combination of devices, systems, integrated circuits, computer programs, or recording media.

Hereinafter, an image generation method and an image generation device according to one aspect of the present disclosure will be specifically described with reference to the drawings.

Note that each of the embodiments described below shows a specific example of the present disclosure. The numerical values, shapes, materials, structural elements, and the arrangement and connection of the structural elements, steps, the processing order of the steps etc., shown in the following embodiments are mere examples, and are not intended to limit the present disclosure. Accordingly, among the structural elements in the following embodiments, structural elements not recited in any one of the independent claims which indicate the broadest concepts will be described as arbitrary structural elements.

Embodiment 1

An image generation system according to Embodiment 1 will be described.

Figure 1:
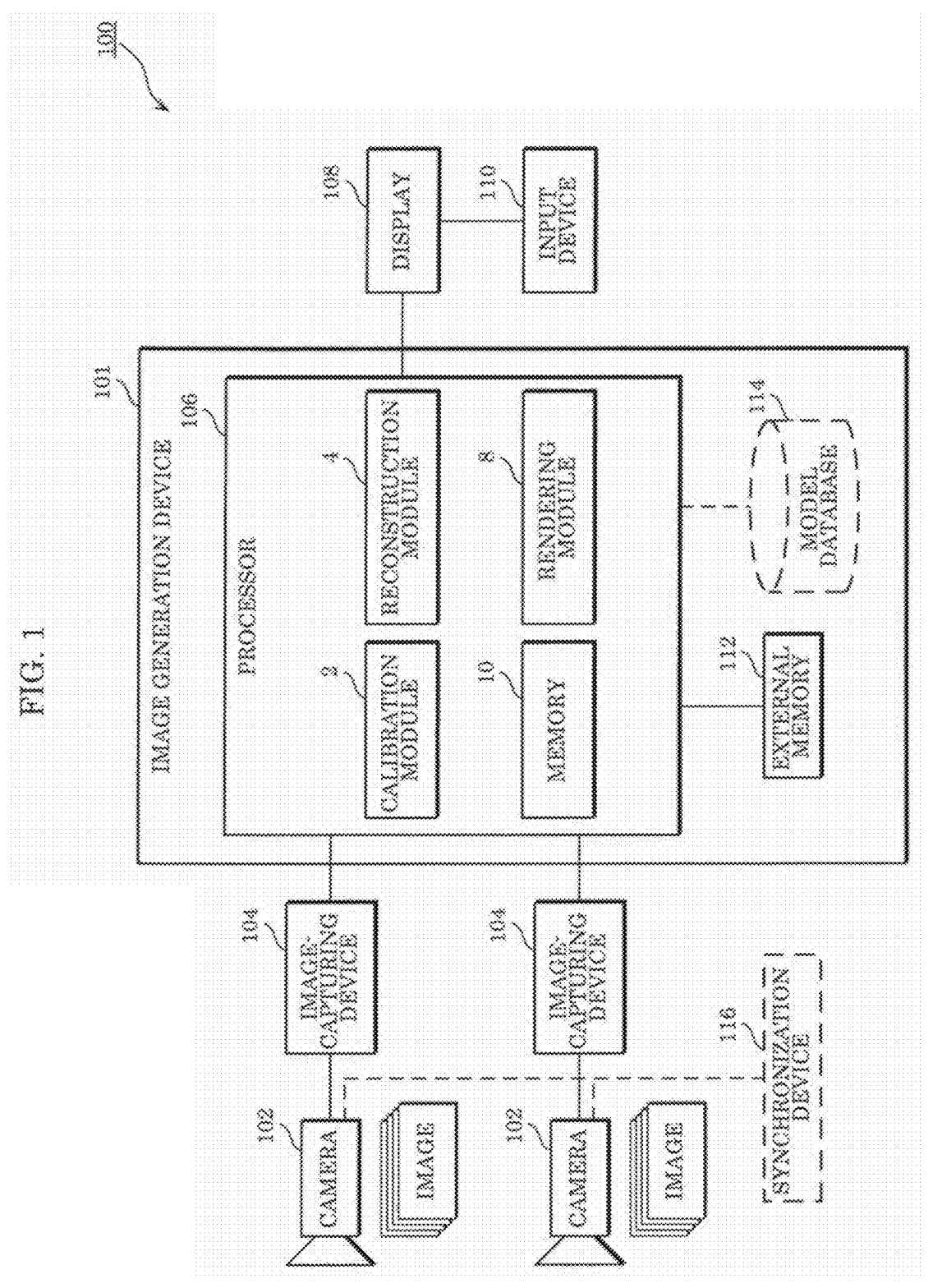

FIG. 1 is a block diagram illustrating an example of the configuration of the image generation system according to Embodiment 1.

As illustrated in FIG. 1, image generation system 100 includes a plurality of cameras 102, a plurality of image-capturing devices 104 connected to corresponding ones of the plurality of cameras 102, image generation device 101, display 108, and input device 110. Image generation system 100 may further include synchronization device 116.

The plurality of cameras 102 are disposed in different positions and secured in different attitudes, and capture images of the same target space in a 3D space. This allows the plurality of cameras 102 to obtain a plurality of images captured from different viewpoints in different viewing directions. The plurality of cameras 102 may obtain the plurality of images by capturing each image with a different timing. The plurality of cameras 102 may be cameras that capture moving images including a plurality of frames as the plurality of images at a predetermined frame rate, for example. The timings of image-capturing by the plurality of cameras 102 may be synchronized by synchronization device 116. Note that although image generation system 100 in FIG. 1 includes two cameras 102, image generation system 100 may include two or more cameras 102.

The plurality of image-capturing devices 104 are provided corresponding to the plurality of cameras 102, respectively, store images captured by the plurality of cameras 102, and output the stored images to processor 106. Note that the plurality of image-capturing devices 104 may be embedded in the plurality of cameras 102. In other words, each of the plurality of cameras 102 may include the function of image-capturing device 104.

Image generation device 101 includes processor 106, external memory 112, and model database 114. Processor 106 includes calibration module 2, reconstruction module 4, rendering module 8, and memory 10.

Calibration module 2 obtains respective camera parameters of the plurality of cameras 102 by performing calibration of the plurality of cameras 102. The camera parameters include: external parameters indicating the position and the attitude of a camera in a 3D space; and internal parameters indicating optical properties such as the focal length, the aberration, and the image center of the camera. The calibration method may be performed using the structure from motion (SFM) technique or may be performed according to a known calibration pattern, for example. The calibration process may be performed at once or may be performed gradually in order to address a change in setup or movement.

Reconstruction module 4 reconstructs a dense, accurate 3D model using a plurality of 2D images captured by the plurality of cameras 102 and the respective camera parameters of the plurality of cameras 102. The 3D model is not limited to that obtained in the manner just described and may also be obtained using sensing data from sensors involving a time-of-flight (ToF) camera, light detection and ranging (LIDAR), a laser scanner, sonar, etc.

Rendering module 8 renders or generates a virtual image of a 3D scene using the 3D model reconstructed by reconstruction module 4 and the plurality of images obtained from the plurality of cameras 102. Rendering module 8 outputs the rendered or generated virtual image to display 108. The virtual image is a 2D image of a target space in a 3D space the images of which are to be captured by the plurality of cameras 102, viewed from a virtual viewpoint different from the viewpoints of the plurality of cameras 102.

The functions of calibration module 2, reconstruction module 4, and rendering module 8 of processor 106 may each be implemented by a general purpose processor executing a program or may each be implemented using a dedicated circuit. In other words, these functions may be implemented with software or may be implemented with hardware.

Memory 10 may temporarily store intermediate data generated in each process performed by calibration module 2, reconstruction module 4, and rendering module 8.

Display 108 connected to processor 106 displays the virtual image output by rendering module 8. In other words, display 108 is a device that displays an image output from processor 106 and is provided, for example, in the form of a liquid-crystal display, an organic electroluminescent (EL) display, or the like. The image output from processor 106 may include a graphical user interface (GUI) for receiving an input.

Input device 110 is connected to display 108, receives, from a user, an input that indicates a virtual viewpoint desired by the user, and outputs, to display 108, an input signal indicating the received input. Input device 110 is implemented, for example, in the form of a remote controller, a gamepad, a mouse, a keyboard, and the like.

Note that when receiving the input signal, display 108 may switch display to a virtual image corresponding to the input signal among the plurality of virtual images viewed from the plurality of virtual viewpoints that have been received from processor 106.

Furthermore, when display 108 has not received from processor 106 the plurality of virtual images viewed from the plurality of viewpoints, display 108 may transmit the input signal to processor 106. In this case, processor 106 generates a virtual image that is viewed from a viewpoint corresponding to the received input signal, and outputs the generated virtual image to display 108. Subsequently, display 108 displays the virtual image output from processor 106. In this case, input device 110, which does not need to be connected to display 108, may be directly connected to image generation device 101 and configured to transmit the input signal to image generation device 101.

Note that the connection described with reference to FIG. 1 is for communication and does not need to be wired electrical connection and may be wireless connection. In other words, the connection may be wired connection for communication or may be wireless connection for communication.

External memory 112 may store, for example, information required by processor 106 such as a program. External memory 112 may store data resulting from processing of processor 106.

Model database 114 stores a pre-generated model of a scene for use in reconstruction module 4 or rendering module 8.

FIG. 2 is a sequence diagram illustrating an example of operations performed by the image generation system according to Embodiment 1.

One image-capturing device 104 transmits, to image generation device 101, an image captured by one camera 102 (S1). Similarly, another image-capturing device 104 transmits, to image generation device 101, an image captured by another camera 102 (S2).

Next, in image generation device 101, processor 106 obtains a plurality of images captured by the plurality of cameras 102 (S3). At this time, processor 106 may obtain a plurality of images captured by the plurality of cameras 102 with the same timing.

Subsequently, reconstruction module 4 of processor 106 generates a 3D model using the plurality of obtained images and the camera parameters of the plurality of cameras 102 obtained by the calibration process already performed by calibration module 2 (S4).

Rendering module 8 of processor 106 generates, using the generated 3D model and the plurality of images, a virtual image of the target space viewed from the virtual viewpoint (S5). Note that details of the process of generating the virtual image will be described later with reference to FIG. 3.

Rendering module 8 outputs the generated virtual image to display 108 (S6).

Input device 110 outputs, to display 108, an input signal indicating a virtual viewpoint desired by a user (S7).

Display 108 displays a virtual image corresponding to the input signal among virtual images output by image generation device 101 (S8).

Note that in the case where input device 110 is directly connected to image generation device 101 to allow communication therebetween, input device 110 may output the input signal to image generation device 101 without passing through display 108. In this case, image generation device 101 generates a virtual image corresponding to the input signal and outputs the generated virtual image to display 108, and the virtual image corresponding to the input signal is displayed on display 108.

FIG. 3 is a flowchart illustrating an example of the process of generating a virtual image by the image generation system according to Embodiment 1. Specifically, the flowchart in FIG. 3 illustrates the processing performed by rendering module 8.

First, rendering module 8 determines, as a pair of reference images, two images captured by two cameras, respectively, among the plurality of cameras 102 (S11). Specifically, rendering module 8 calculates, for each of a plurality of views captured by the plurality of cameras 102 from a plurality of viewpoints and a virtual view from a virtual viewpoint designated by a user, visibility indicating whether or not each of a plurality of 3D points constituting a 3D model is visible. Furthermore, in the process of calculating the visibility, rendering module 8 determines a pair of reference images to be used to generate a virtual image among the plurality of images captured by the plurality of cameras 102. Note that details of the process of determining a reference image will be described later.

Next, using the calculated 3D point visibility, rendering module 8 starts loop 1 in which the processing in Steps S13 to S15 described below is performed for each of the plurality of 3D points (S12).

Rendering module 8 determines whether or not a current 3D point is visible in both of two reference views that are two views captured by two cameras 102 from which the pair of reference images have been obtained (S13).

When the current 3D point is determined as being visible in both of the reference views (YES in S13), rendering module 8 blends two textures obtained from both of the reference views (S14) and stores the blending result.

When the current 3D point is determined as not being visible in both of the reference views (NO in S13), that is, when the current 3D point is determined as being invisible in at least one of the two reference views, rendering module 8 performs at least one of the luminance adjustment and the color adjustment on a texture to be attached to the 3D point (S15) and stores the result of at least one of the luminance adjustment and the color adjustment. Note that details of the luminance adjustment and the color adjustment will be described later with reference to FIG. 9.

After Steps S14 and S15, rendering module 8 performs Steps S13 to S15 on a subsequent 3D point among the plurality of 3D points on which the processing in loop 1 has not yet been performed.

When performing the processing in Steps S13 to S15 on all of the plurality of 3D points, rendering module 8 ends loop 1, attaches the plurality of textures generated in loop 1 to the plurality of corresponding 3D points to join the plurality of textures together, thereby generating a virtual image (S16). Note that rendering module 8 may generate a virtual image by joining the plurality of textures generated in loop 1 together in the 2D plane. In the virtual image synthesis, post-processing such as filtering and denoising may further be performed to obtain better image quality. Note that the generated virtual image may be output to storage and stored in the storage.

In this manner, rendering module 8 performs Step S14 as the first process on regions of the pair of reference images that correspond to the 3D points, thereby generating a first region which is a region of the virtual image that corresponds to the 3D points. Furthermore, when the plurality of 3D points are not visible in the pair of reference view, rendering module 8 performs Step S15 as the second process on the texture of an image captured by another camera, thereby generating a second region which is a region of the virtual image that corresponds to the 3D points. The first process includes the process of blending, at a predetermined blending ratio, at least one of the luminance and the color of a pair of reference images captured by a pair of reference cameras to adjust at least one of the luminance and the color. The second process includes the process of adjusting at least one of the luminance and the color to approach the luminance or the color obtained by the blending process using a difference in at least one of the luminance and the color that is obtained by comparing a first background image obtained by the pair of reference cameras and at least one second background image obtained by another camera.

In this manner, generating a virtual image includes: (i) generating the first region of the virtual image by performing, on a pair of reference images that are one or more first image, the process of combining two textures as the first process, and (ii) generating the second region of the virtual image by performing, on an image in another view that is one or more second images, an adjustment process including at least one of the luminance adjustment and the color adjustment. Thus, the likelihood of a difference in luminance or color occurring between the plurality of regions in the virtual image can be reduced. As a result, it is possible to reduce visual discomfort that may be felt by users.

A proxy to which the plurality of textures generated by loop 1 are attached may be rectangular or may be circular.

A plurality of textures from a plurality of images may overlap at the same 3D point and cause blurring; thus, there are cases in which as few images as possible should be used in the virtual image synthesis. Therefore, one or two reference images that become the source of textures for almost all the 3D points are selected according to the visibility of the 3D points in a plurality of views from the plurality of cameras 102. In the virtual image synthesis, in order to find a texture with better quality, especially, a texture with a lower level of noise and/or less distortion, more images may be used.

FIG. 4 is a flowchart illustrating an example of the process of calculating visibility by the rendering module.

Using the 3D model and corresponding camera parameters, rendering module 8 projects the 3D model for each of the virtual view and the plurality of views from the plurality of cameras 102 and calculates a depth map including 3D coordinates based on the view (S21). The depth map is information including 2D coordinates of a base view and a depth coordinate indicating, for each coordinate of the 2D coordinates, the position of a 3D model in the viewing direction of said view. The 2D coordinates herein may indicate the 2D position of a pixel in a 2D image. In other words, the depth map may be an image obtained by adding, to each pixel in a 2D image, the distance between the pixel and an object. The view is a two-dimensional perspective (two-dimensional images) visible from corresponding camera 102 and defined by the angle of view of said camera 102. The view may be a viewpoint or a field of view. This means that an image obtained from camera 102 is a 2D image obtained as a result of the view being captured by said camera 102. The depth map is of the same size as the 2D image of each view obtained by camera 102 and is initialized as positive infinity. Details of the process of calculating the depth map will be described later.

Note that the visibility of each of the plurality of 3D points constituting the 3D model may be calculated before the depth map is generated or may be calculated while the depth map is generated.

Rendering module 8 performs, using the calculated depth map, calculation of whether or not each of the plurality of 3D points constituting the 3D model is visible in each of the plurality of view (S22).

Using the calculated visibility of the plurality of 3D points in each of the plurality of views, rendering module 8 calculates visibility, in each view, of each of the plurality of 3D points corresponding to one of the plurality of pixels of a 2D image obtained by projecting the 3D points to the virtual view (S23).

Rendering module 8 determines, as reference views, some views each of which has been determined as the best view among the plurality of views (S24). Thus, information indicating the visibility in the plurality of views, the virtual view, and the reference views is output.

FIG. 5 is a flowchart illustrating an example of the process of calculating the depth map.

Rendering module 8 starts loop 2 in which the processing in loop 3 in Step S32 described below is performed for each of the plurality of views (S31).

Rendering module 8 starts loop 3 in which the processing in Steps S33 to S35 described below is performed for each of the plurality of 3D points constituting the 3D model (S32).

Using a camera parameter corresponding to the current view, rendering module 8 projects the current 3D point to said view (S33). Thus, 3D coordinates of the 3D point based on said view are obtained. The obtained 3D coordinates include 2D coordinates indicating positions in the vertical and horizontal directions in a 2D view defined by the current view, and coordinates indicating a position in the depth direction parallel to the viewing direction of said view. Note that the vertical direction may be determined using the vertical direction of camera 102 as a reference or may be determined using, as a reference, a direction in which the gravitational acceleration of the Earth acts.

Next, rendering module 8 compares the 3D coordinates obtained by projecting the current 3D point and the 3D coordinates obtained by projecting the past 3D point and determines whether or not a coordinate indicating a position in the depth direction in the 3D coordinates with corresponding (for example, matching) 2D coordinates is small (S34). In other words, it is determined whether or not the 3D coordinates of the projected current 3D point are nearer to corresponding camera 102 than the 3D coordinates of one of the projected past 3D points that shares 2D coordinates in a 2D view with the current 3D point are.

When determining that the 3D coordinates obtained by projecting the current 3D point have a smaller coordinate in the depth direction than the 3D coordinates obtained by projecting the past 3D point (YES in S34), rendering module 8 stores the 3D coordinates obtained by the projecting the current 3D point (S35).

When performing the processing in Steps S33 to S35 on all of the plurality of 3D points, rendering module 8 ends loop 3.

When performing the processing in loop 3 on all of the plurality of views, rendering module 8 ends loop 2.

When loop 2 is ended, the process of calculating the depth map is ended. Note that rendering module 8 may obtain a depth map from reconstruction module 4 without performing the processing described with reference to FIG. 5.

FIG. 6 is a flowchart illustrating an example of the process of calculating the visibility.

Rendering module 8 starts loop 4 in which the processing in loop 5 in Step S42 described below is performed for each of the plurality of views (S41).

Rendering module 8 starts loop 5 in which the processing in Steps S43 to S45 described below is performed for each of the plurality of 3D points constituting the 3D model (S42).

Using a camera parameter corresponding to the current view, rendering module 8 projects the current 3D point to said view (S43).

Next, rendering module 8 compares the 3D coordinates obtained by projecting the current 3D point and the 3D coordinates obtained by projecting the past 3D point and determines whether or not a coordinate indicating a position in the depth direction in the 3D coordinates with corresponding (for example, matching) 2D coordinates is large (S44). In other words, it is determined whether or not the 3D coordinates of the projected current 3D point are farther from corresponding camera 102 than the 3D coordinates of one of the projected past 3D points that shares 2D coordinates in a 2D view with the current 3D point are.

When determining that the 3D coordinates obtained by projecting the current 3D point have a larger coordinate in the depth direction than the 3D coordinates obtained by projecting the past 3D point (YES in S44), rendering module 8 calculates visibility of the current 3D point as an invisible point (S45).

When performing the processing in Steps S43 to S45 on all of the plurality of 3D points, rendering module 8 ends loop 5.

When performing the processing in loop 5 on all of the plurality of views, rendering module 8 ends loop 4.

When loop 4 is ended, the process of calculating the visibility is ended.

Note that the process of calculating the visibility may be performed together with the process of calculating the depth map. Specifically, in the above description of the flowchart in FIG. 5, when the determination result of Step S34 is NO, loop 3 is ended, but this is not limiting; loop 3 may be ended after the processing in Step S45 is performed. This allows the process of calculating the visibility described with reference to FIG. 6 to be incorporated into the process of calculating the depth map described with reference to FIG. 5. The visibility may be calculated before the process of generating the 3D model in Step S4.

FIG. 7 is a flowchart illustrating an example of the process of calculating 2D pixel visibility.

Using the calculated visibility of the 3D point in each of the plurality of views, rendering module 8 calculates, for each of a plurality of pixels included in a 2D image in a virtual view which is a view from a virtual viewpoint, visibility indicating whether or not a 3D point corresponding to the pixel is visible in each of the plurality of views (S51). In other words, for each of a plurality of candidate points among a plurality of 3D points that has been determined as being visible from the virtual viewpoint, rendering module 8 extracts, from a plurality of cameras, a camera that captures an image of the candidate point.

Using the calculated visibility, rendering module 8 extracts the visibility of reference views which are a pair of views among the plurality of views (S52). In other words, rendering module 8 extracts the visibility of a pair of reference views that satisfy a predetermined condition.

Rendering module 8 stores, as a flag image associated with each pixel, information indicating visibility calculated for each of the plurality of pixels of the 2D image and indicating whether or not a 3D point corresponding the pixel is visible (S53). Note that the flag image may be represented in the form of a RGB image.

FIG. 8 is a flowchart illustrating an example of the process of determining reference views.

Using corresponding camera parameters, rendering module 8 calculates the positions and the attitudes of the plurality of cameras 102 respectively corresponding to the plurality of views (S61).

Using the calculated positions and attitudes of the plurality of cameras 102, rendering module 8 selects, as reference views, two views corresponding to two cameras nearest to the virtual view (S62). Note that the two cameras nearest to the virtual view may be two cameras located at the shortest distance from the position of the virtual camera corresponding to the virtual view or may be two cameras having image-capturing directions with the smallest difference in angle with respect to the viewing direction of the virtual view.

Rendering module 8 calculates proximity of each of the selected two reference views to the virtual view (S63). The proximity may be the distance between the virtual camera and a camera corresponding to a reference view or may be the angle formed between the reference view and the virtual view, for example. The proximity may be used as a blending ratio for blending, upon image synthesis, two reference images obtained from two cameras 102 corresponding to the two reference views.

Note that in the case where the camera settings of the plurality of cameras 102 are irregular or the installation heights of the plurality of cameras 102 are different, the angular field of view (angle of view) of the virtual view or the height of the virtual viewpoint can be used. As the reference views, views satisfying conditions predefined by a user may be selected.

In this manner, the reference views are determined in Step S11.

Due to occlusion of the 3D object, some regions may not be displayed in both of the pair of reference views; thus, it is not always possible to obtain textures from the pair of reference views. Therefore, in Step S13 in the process of generating the virtual image in FIG. 3, whether or not the 3D point is visible in the pair of reference views is determined to distinguish such cases.

FIG. 9 is a flowchart illustrating an example of an adjustment process.

Rendering module 8 determines whether or not the current 3D point is visible in one of the pair of reference views (S71). The current 3D point herein is a 3D point subject to the processing in loop 1 in FIG. 3. The adjustment process is performed when the determination result of Step S13 is NO; thus, by making the determination in Step S71, it is possible to determine whether the 3D point is visible in one of the reference views or invisible in both of the reference views.

When the current 3D point is visible in one of the pair of reference views (YES in S71), rendering module 8 obtains a texture from an image captured by a camera corresponding to said one reference view (S72).

On the other hand, when the current 3D point is invisible in both of the pair of reference views (NO in S71), rendering module 8 searches images captured by cameras 102 corresponding to views other than the pair of reference views among the plurality of views for an available texture (S73). Details of the process of searching for a texture will be described later with reference to FIG. 10.

Next, rendering module 8 calculates an adjustment ratio for adjusting at least one of the luminance and the color of the obtained texture (S74). The adjustment ratio includes a luminance ratio for adjusting the luminance and a color ratio for adjusting the color. The color ratio is based on an index that defines chrominance. The color ratio may be based on an index that defines a color and when the color is defined using RGB, the color ratio may be a ratio of RGB (red, green, and blue) gains. When the color ratio is based on an index that defines a color, the luminance adjustment does not need to be performed. Details of the process of calculating the adjustment ratio will be described later with reference to FIG. 13.

Using the calculated adjustment ratio, rendering module 8 adjusts the texture obtained in Step S72 or Step S73 in accordance with textures obtained from the reference images captured by the pair of reference cameras corresponding to the pair of reference views (S75). As a result, it is possible to obtain a virtual image with a smaller difference in luminance or color.

Figure 11:
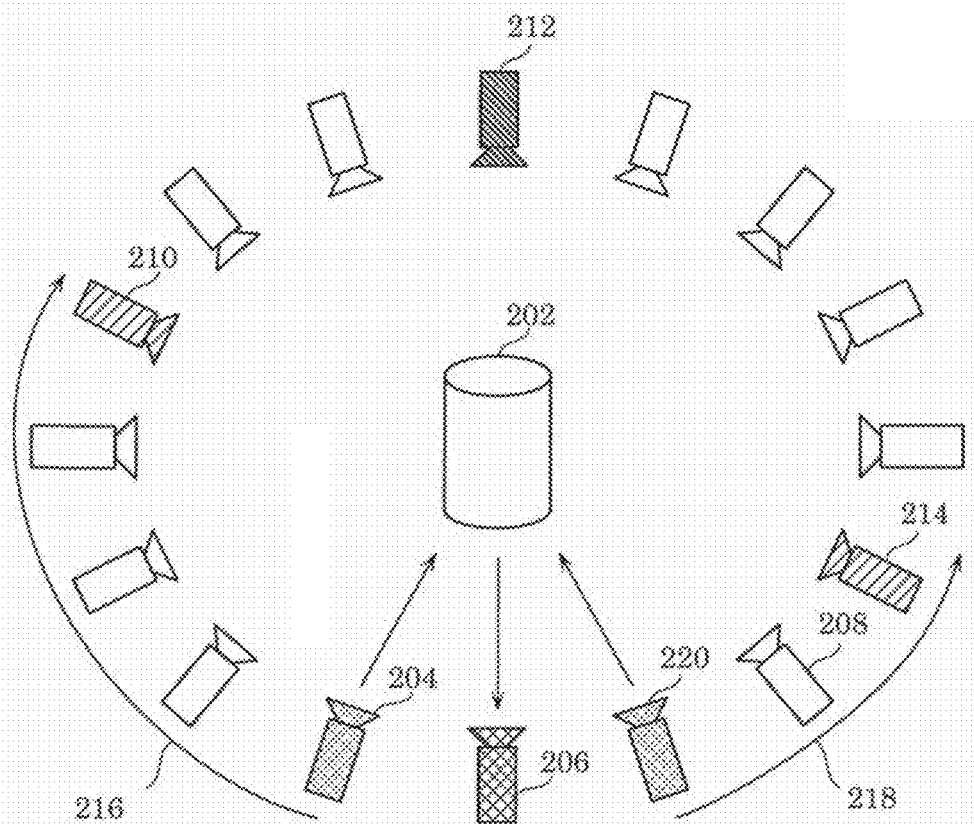
FIG. 11 is a diagram for describing the process of searching a plurality of views for an available texture.

FIG. 10 is a flowchart illustrating the process of searching for a texture by changing a view to two directions starting from the pair of reference views. FIG. 11 is a diagram for describing the process of searching a plurality of views for an available texture.

FIG. 11 illustrates a configuration in which a plurality of cameras that capture images of 3D object 202 are arranged surrounding 3D object 202; among the plurality of cameras, camera 206 is a virtual camera corresponding to a virtual view, and cameras other than camera 206 correspond to the plurality of cameras 102. Reference cameras 204, 220 corresponding to two reference views are illustrated adjacent to and on both sides of camera 206.

When the current 3D point is invisible in the reference views corresponding to both of reference cameras 204, 220 among the plurality of camera except camera 206, rendering module 8 performs the process of searching for a texture by switching between the cameras along two arrows 216, 218 starting from two reference cameras 204, 220. Rendering module 8 sequentially switches to adjacent views along arrows 216, 218 starting from reference cameras 204, 220 corresponding to the reference views and thereby searches for a texture in which the current 3D point is visible in the resultant view.

Specifically, rendering module 8 selects a view of a camera adjacent to the reference camera (S81). For example, rendering module 8 selects a view of a camera adjacent to reference camera 204 in the direction of arrow 216 and selects a view of a camera adjacent to reference camera 220 in the direction of arrow 218. Alternatively, in the case where a predetermined sequence has been set, rendering module 8 may select a view of a camera that follows reference camera 204 in the sequence.

Next, rendering module 8 determines whether or not the current 3D point is visible in the selected view (S82). This determination may be made using the depth map obtained in Step S21 or may be made using the visibility of the 3D point obtained in Step S22.

When the current 3D point is visible in the selected view (YES in S82), rendering module 8 determines said view as a candidate (S83).

When the current 3D point is invisible in the selected view (NO in S82) or after Step S83, rendering module 8 determines whether or not the current view is opposite to the virtual view (S84), and when the current view is the opposite view (YES in S84), the processing ends, and when the current view is not the opposite view (NO in S84), the processing returns to Step S81.

Rendering module 8 selects a texture from an image captured by a camera corresponding to a view nearer to reference camera 204 or 220 serving as a starting point among one or more views determined as candidates (S85).

Note that, for example, when determining that after switching up to camera 210, the current 3D point is invisible in views of cameras between camera 204 and camera 210 and the current 3D point is visible for the first time in a view of camera 210, rendering module 8 may obtain a texture from an image captured by camera 210 and complete the searching process. Similarly, for example, when determining that after switching up to camera 214, the current 3D point is invisible in views of cameras between camera 220 and camera 214 and the current 3D point is visible for the first time in a view of camera 214, rendering module 8 may obtain a texture from an image captured by camera 214 and complete the searching process. In this case, when a view in which the current 3D point is visible is not found, rendering module 8 sequentially switches the view up to camera 212 corresponding to the opposite view and geometrically farthest to reference cameras 204, 220 corresponding to the two reference views.

Note that the search method is not limited to the method illustrated in FIG. 11. For example, when the plurality of cameras are not arranged in a two-dimensional ring surrounding 3D object 202 unlike the illustration in FIG. 11, the sequence of switching between the views, that is, the search order, may be determined according to other geometric properties such as the angular field of view (angle of view) of each camera and the installation height of each camera. Alternatively, when the plurality of cameras are not installed in a regular pattern or when some of the cameras need to be disabled, the search order may be an order defined by a user in advance.

Figure 12:
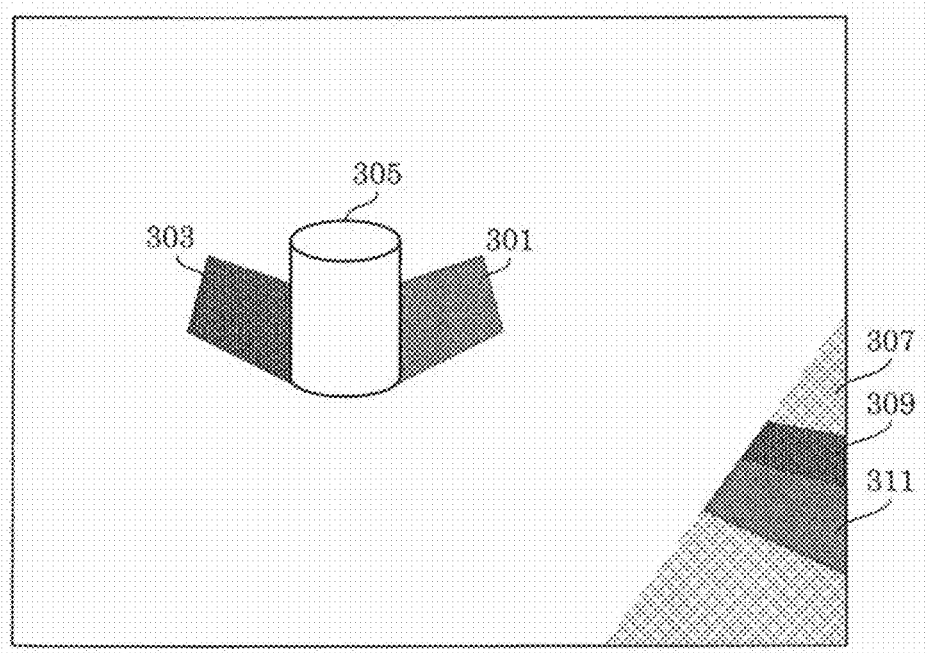
FIG. 12 is a diagram illustrating an example of a difference in luminance or color of a virtual image on which an adjustment process has not been performed.

FIG. 12 is a diagram illustrating an example of a difference in luminance or color of a virtual image on which the adjustment process has not been performed.

Object 305 illustrated in FIG. 12 is, for example, a 3D object placed on the ground. A virtual view from a virtual viewpoint includes regions 301, 303 which are invisible in one of the pair of reference views due to occlusion. Regions 301, 303 invisible in the reference view are determined as being invisible in the calculation of the visibility in the reference view, and thus no texture can be obtained from an image obtained by a camera corresponding to said reference view. For example, invisible region 301 is invisible in a first reference view and is visible in a second reference view. Invisible region 303 is invisible in the second reference view and is visible in the first reference view. As just described, each of invisible regions 301, 303 is visible in one of the reference views, and thus rendering module 8 can obtain a texture from the one reference view. In the case where the two reference views have different colors in that regions such as a case where no reliable calibration is conducted, there is an obvious color difference between invisible region 301 and invisible region 303. Furthermore, in this case, there is an obvious color difference between invisible regions 301, 303 and the other regions on the ground that are visible in both of the reference views. Since the coverage of a view is limited, especially a corner region of the virtual view may be visible in neither of the reference views. For such a region invisible in both of the reference views, another view is searched for and a corresponding texture is obtained as described with reference to FIG. 10. There are cases where the texture obtained from another view does not fit with a region visible in both of the reference views. Thus, a color difference such as that mentioned above occurs. In both cases, the luminance or the color is adjusted through the above-described adjustment process; therefore, it is possible to apply a texture with a small color difference in a region that actually appears in the same color. Thus, it is possible to reduce generation of a virtual image with an artifact that makes the color different in a region that actually appears in the same color.

A similar artifact may occur on foreground objects as well between which there is an occlusion (obstruction) in particular. In this case, the adjustment process is separately performed on the foreground. Especially, this can be applied to synthesized background images if the artifact becomes obvious.

FIG. 13 is a flowchart illustrating an example of the process of calculating an adjustment ratio.

Using the 3D model and the camera parameters of the plurality of cameras 102, rendering module 8 projects the 3D model for each of the plurality of views, and thus specifies correspondence between pixels of a plurality of images obtained by the plurality of cameras 102 (S91). For example, rendering module 8 specifies the correspondence between a plurality of first pixels included in a first reference image and a plurality of second pixels included in a second reference pixel among a pair of reference images obtained by reference cameras corresponding to a pair of reference views. Rendering module 8 determines, as corresponding pixels, the first pixel and the second pixel that share a 3D point. Furthermore, rendering module 8 determines, in substantially the same way, correspondence between images from which textures have been obtained.

Rendering module 8 calculates a difference in luminance or color between two pixels determined as corresponding pixels (S92). Rendering module 8 may calculate a difference in luminance or color between two pixels using background images captured in advance by the plurality of cameras 102. Note that the difference in luminance or color can be calculated even in the case where predetermined background images are not available. For example, it is possible to detect a foreground object on a plurality of images obtained from the plurality of cameras 102 and find a desired texture included in an already-obtained image having a background texture at a target pixel.

Using an image in an available view, rendering module 8 estimates an adjustment ratio for a region invisible in any of the plurality of views (S93). The process of estimating the adjustment ratio will be described later with reference to FIG. 14.

FIG. 14 is a flowchart illustrating an example of the process of estimating the adjustment ratio.

Using the correspondence of 2D pixels, rendering module 8 obtains 2D coordinates of each of the 2D coordinates in the virtual view, on a plurality of images used to obtain textures and including a pair of reference images (S101).

Rendering module 8 determines, for each of the 2D coordinates in each view, whether or not the current 2D coordinates are within the region of the current view (S102). For example, when the current 2D coordinates indicate a negative value on the 2D coordinates in the current view or has a greater coordinate than the size of the image in the current view, rendering module 8 determines that the current 2D coordinates are not within the image region of the current view. The coordinate in this case is invalid, and a pixel having the coordinate does not correspond to any of the plurality of images.

When determining that the current 2D coordinates are within the region of the current view (YES in S102), rendering module 8 stores, in association with the current 2D coordinates, a texture at a pixel within the region of the current view that corresponds to the current 2D coordinates (S103).

When determining that the current 2D coordinates are not within the region of the current view (NO in S102), rendering module 8 obtains a texture at a pixel assigned to valid 2D coordinates that are in the current view and nearest to and different from the current 2D coordinates, and associates the current 2D coordinates and the obtained texture at the pixel (S104). Here, the valid 2D coordinates have corresponding coordinates in the regions of more than one images that are used to obtain textures.

Note that the processing in Steps S102 to S104 is repeatedly performed for all the 2D coordinates in the virtual view, and every one of the 2D coordinates is associated with a texture at one of the plurality of images. Note that the 2D coordinates corresponding to both of two reference images are associated with the textures from the two reference images.

Rendering module 8 calculates an adjustment ratio for each of all the 2D coordinates using the texture associated with the 2D coordinates (S105). For example, for the 2D coordinates associated with the textures from two reference images, rendering module 8 calculates an adjustment ratio using the textures from the two reference images. Specifically, when coordinates XA in current view A and coordinates XB in current view B correspond to current 2D coordinates X in the virtual view, rendering module 8 calculates adjustment ratio rAB=PA/PB using value PA of coordinates XA obtained from background image IA in current view A and value PB of coordinates XB obtained from background image IB in current view B. Note that rendering module 8 may calculate adjustment ratio rBA=PB/PA which is a reciprocal for adjustment ratio rAB. In this way, rendering module 8 generates a synthesized virtual image in the virtual view in consideration of the adjustment ratio for each pixel between current views. Note that value PA and value PB may be luminance or may be a value in an index indicating a color.

FIG. 15 is a diagram for describing an adjustment process in which an adjustment ratio obtained from two views is used.

For region 402 and region 404 having textures obtained from one of reference views, the adjustment ratio between the reference views on these regions is calculated using predetermined background images. The adjustment ratio calculated here is indicated as image 406 and image 408. The blending ratio is the ratio for blending the textures between the two reference views to obtain a new texture in the virtual view. The blending ratio is obtained in Step S24 in FIG. 4. In Step S24, the two reference views and the ratio between the two reference views are also obtained. The blending ratio and the adjustment ratio between image 406 and image 408 are used together to adjust a difference in luminance or color on the rendered virtual image in the virtual view. These ratios are applied in Step S75 in FIG. 9. The color of the texture obtained from one reference view after the adjustment process is applied may be adjusted to have the color blended by the two reference views.

Figure 16:
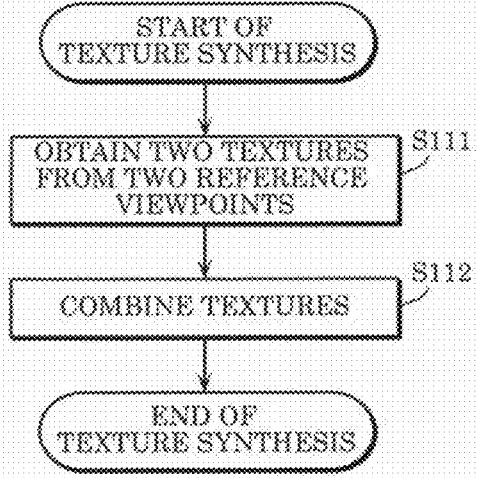
FIG. 16 is a flowchart illustrating an example of the process of combining textures obtained from reference views.

FIG. 16 is a flowchart illustrating an example of the process of combining the textures obtained from the reference views. This process is a rendering process performed on a region in the virtual view that is visible in both of the reference views and is an example of the synthesis process in Step S14 performed on the region determined as YES in Step S13 in FIG. 3.

Rendering module 8 obtains textures from two reference images obtained from two reference cameras corresponding to the two reference views (S111). Rendering module 8 does not need to obtain one texture from accurately corresponding coordinates in the tow reference views and may obtain a plurality of textures from a plurality of pixels adjacent to the corresponding coordinates. Rendering module 8 may select one texture from the plurality of textures thus obtained or may merge the plurality of textures thus obtained. As a result of obtaining the plurality of textures in this way, texture misalignment due to 3D model accuracy can be reduced.

Rendering module 8 blends, using the calculated blending ratio, two textures obtained from the two reference images (S112).

In the image generation method according to the present embodiment, when the cameras that have captured a plurality of images to be used to generate the virtual image have different configurations, different adjustment processes are performed, and thus the likelihood of a difference in luminance or color occurring between the plurality of regions in the virtual image can be reduced. As a result, it is possible to reduce visual discomfort that may be felt by users when the user looks at the virtual image.

Furthermore, in the image generation method according to the present embodiment, among the plurality of cameras 102, two cameras located nearest to the virtual viewpoint are selected as the pair of reference cameras. Thus, the image captured in the nearest view from the virtual viewpoint can be used to generate the virtual image.

Embodiment 2

An image generation system according to Embodiment 2 will be described.

In the image generation system according to Embodiment 2 which is similar to image generation system 100 according to Embodiment 1, the process of generating a virtual image by rendering module 8 of processor 106 is different. Embodiment 2 is applicable in the case where, when different cameras capture images of the same flat face in a 3D space such as an athletic field, the floor of a gymnasium, and the ground, the process of synthesizing the images of the flat surface by projective transformation is performed. Specifically, rendering module 8 generates a region of a virtual image that corresponds to a flat face by projective transformation of a plurality of first images which are a pair of reference images, and in the case of using a plurality of second images different from the pair of reference images, generates a region of the virtual image that corresponds to a flat face by projective transformation of the plurality of second images. Therefore, processor 106 obtains, from the plurality of cameras 102, a plurality of images including images of the same flat face.

Figure 17:
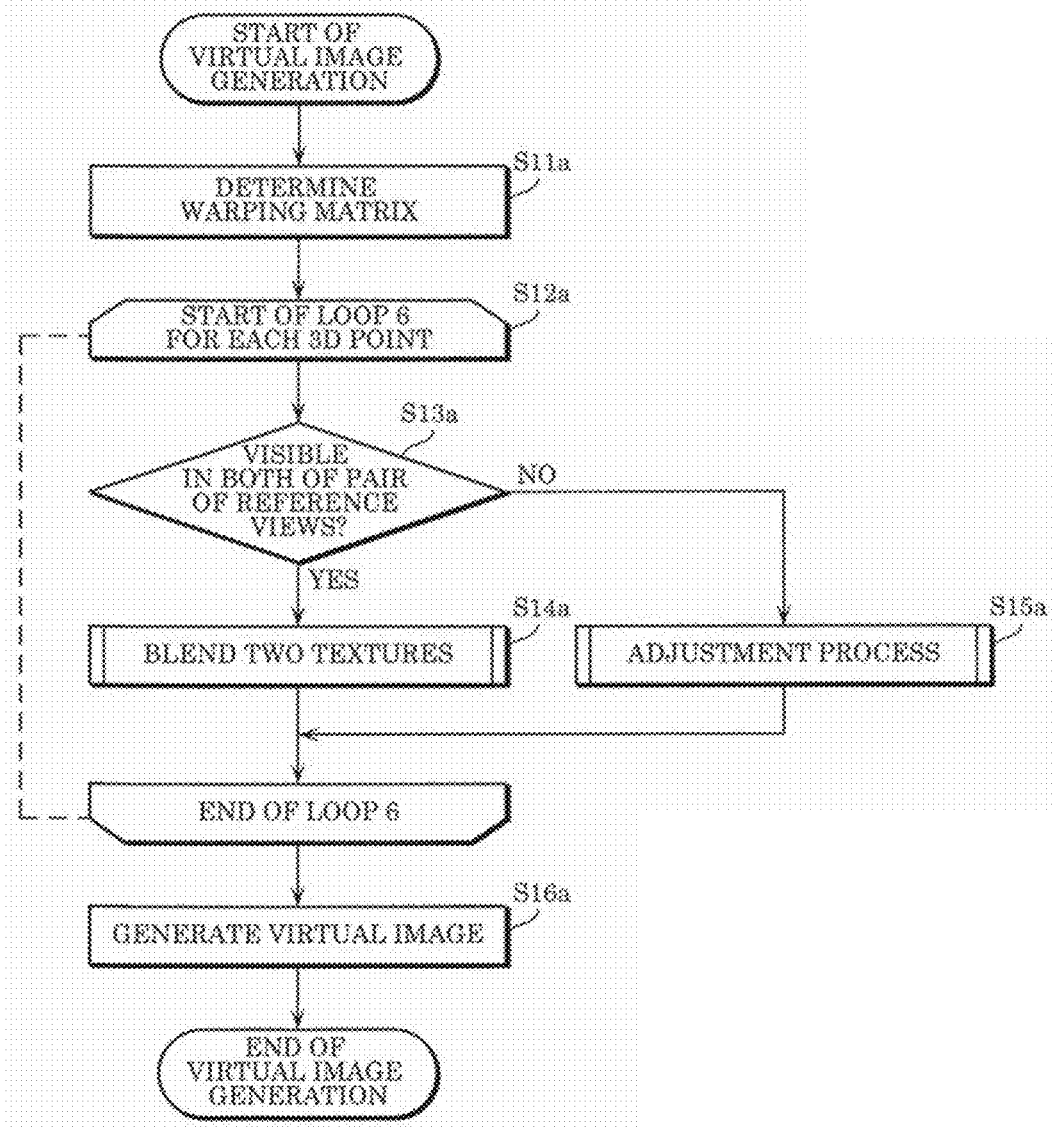
FIG. 17 is a flowchart illustrating an example of the process of generating a virtual image by an image generation system according to Embodiment 2.

FIG. 17 is a flowchart illustrating an example of the process of generating a virtual image by the image generation system according to Embodiment 2. In other words, in Embodiment 2, instead of the process of generating the virtual image in FIG. 3 in Embodiment 1, the process illustrated in the flowchart in FIG. 17 is performed.

Rendering module 8 calculates a warping matrix between the virtual view and each of a plurality of views captured by the plurality of cameras 102 (S11a). The warping matrix indicates pixel (or coordinate) correspondence between a pair of images (or views) captured from different viewpoints. Note that the warping matrix may indicate not only the pixel correspondence between a pair of images, but also correspondence between regions when the pair of images are divided into a plurality of regions. With this, corresponding coordinates between the virtual view and each of the plurality of views are obtained. In other words, in the warping matrix, each of the pixels included in the virtual view is associated with a pixel in each of the plurality of views. Rendering module 8 may determine a pair of reference images in Step S11a. The pair of reference images can be determined in substantially the same way as in Embodiment 1.

Using the calculated warping matrix, rendering module 8 starts loop 6 in which the processing in Steps S13a to S15a is performed for each of the plurality of pixels included in the virtual view (S12a)

Rendering module 8 determines whether or not a current pixel is valid in both of two reference views that are two views captured by two cameras 102 from which the pair of reference images have been obtained (S13a). Whether the pixel is valid can be determined in substantially the same way as in the determination in Step S102 in Embodiment 1.

When the current pixel is determined as being valid in both of the reference views (YES in S13a), rendering module 8 blends two textures obtained from both of the reference views (S14a) and stores the blending result. The textures can be blended in Step S14a in substantially the same way as in the texture blending in Step S14.

When the current pixel is determined as not being valid in both of the reference views (NO in S13a), rendering module 8 perform the adjustment process on a texture to be applied to the pixel (S15a) and stores the result of the adjustment process. The adjustment process in Step S15a can be substantially the same as the adjustment process in Step S15.

After Steps S14a and S15a, rendering module 8 performs Steps S13a to S15a on a subsequent pixel among the plurality of pixels on which the processing in loop 6 has not yet been performed.

When performing the processing in Steps S13a to S15a on all of the plurality of pixels, rendering module 8 ends loop 6, applies the plurality of textures generated in loop 6 to the plurality of corresponding pixels to join the plurality of textures together, thereby generating a virtual image (S16a). In the virtual image synthesis, post-processing such as filtering and denoising may further be performed to obtain better image quality. Note that the generated virtual image may be output to storage and stored in the storage.

Variations

In Embodiments 1 and 2 described above, at the time of generating a virtual image using a pair of reference images among a plurality of images captured by the plurality of cameras 102, the process of blending two textures obtained from the pair of reference images is performed, but this is not limiting; the virtual image may be generated from a single reference image. In this case, when the 3D point is not present in the single reference image, the virtual image may be generated by applying the adjustment process to at least one image captured by a camera among the plurality of cameras 102 that is different from the reference cameras. In other words, in Embodiment 1 and 2, at the time of generating a virtual image using the plurality of first images serving as a basis, the virtual image is generated using the plurality of second images if the plurality of first images serving as a basis are not available, but this is not limiting. At the time of generating a virtual image using a single first image serving as a basis, if the single first image is not available, a virtual image may be generated using the plurality of second images.

In other words, in the case of generating a virtual image using one or more second images captured by one or more second cameras, at least one of which is different from one or more first cameras that capture one or more first images serving as a basis among a plurality of images, processor 106 generates a virtual image by performing, on the one or more second images, the second process including the adjustment process and different from the first process which is performed to generate a virtual image using the one or more first images.

Thus, in the case of generating a virtual image using one or more second images, the second process including the adjustment process and different from the first process which is performed to generate a virtual image using one or more first images is performed on the one or more second images; therefore, the likelihood of a difference in luminance or color occurring between a plurality of regions in the virtual image or a plurality of frames can be reduced. As a result, it is possible to reduce visual discomfort that may be felt by users.

Furthermore, Embodiments 1 and 2 show, as an example, the case where there are both a region on which the process of blending two textures is performed and a region on which the adjustment process is performed, but, when every 3D point is determined as being visible in the entire region, that is, in both of the pair of reference views, the process of blending two textures may be performed without the adjustment process. Similarly, when every 3D point is determined as being invisible in both of the pair of reference views, the adjustment process may be performed without the process of blending two textures.

In Embodiment 1 described above, FIG. 11 shows an example in which a plurality of cameras corresponding to a plurality of views are arranged in a ring in a two-dimensional plane, but this is not limiting; a plurality of cameras corresponding to a plurality of views may be arranged in a three-dimensional space. In this case, at the time of performing the process of searching for a texture, it is necessary to use a method different from the method used in the case in FIG. 11.

Figure 18:
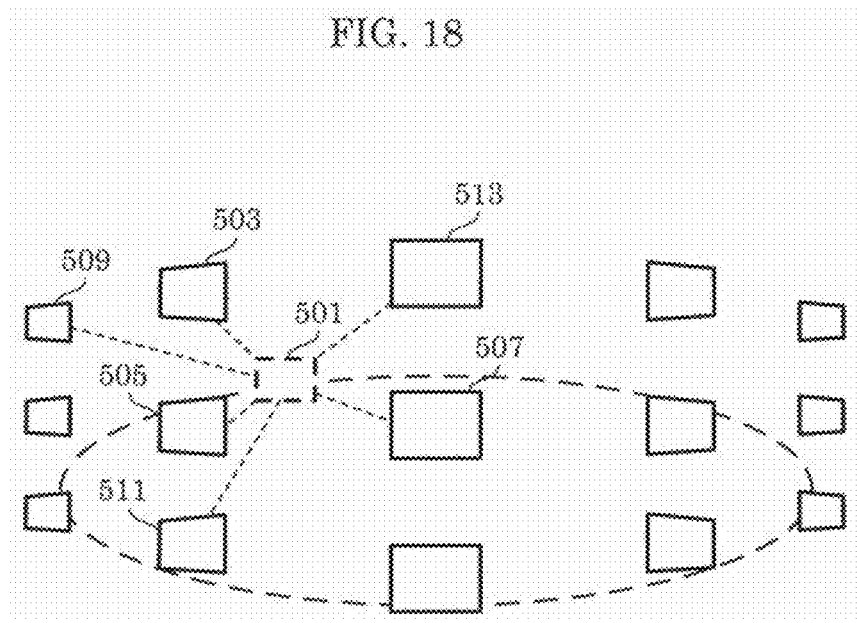
FIG. 18 is a diagram for describing another method for searching a plurality of views for an available texture.

FIG. 18 is a diagram for describing another method for searching a plurality of views for an available texture.

In FIG. 18, polygon 501 represents a virtual view. Polygons 503, 505, 507, 509, and 511 and other polygons represent a plurality of views captured by a plurality of cameras. With the layout of the plurality of cameras in FIG. 18, three views nearest to the virtual view may be selected, for example. In this case, polygons 503, 505, and 507 nearest to polygon 501 are selected. In three views corresponding to polygons 503, 505, and 507, the visibility is determined as described in Embodiment 1, and when there is visibility, available textures are extracted from the selected views. When there is no visibility in any of these three views, the next three nearest views can be selected. For example, polygons 509, 511, and 513 may be selected. In this way, the texture search is conducted until views in which the 3D point is visible is found, as in the case of Embodiment 1. The views are classified into a plurality of groups according to the distance from the virtual view, and the texture search is conducted for each of the groups. The distances between the virtual view and views belonging to the same group are similar, and thus good quality synthesis is possible.

Figure 19:
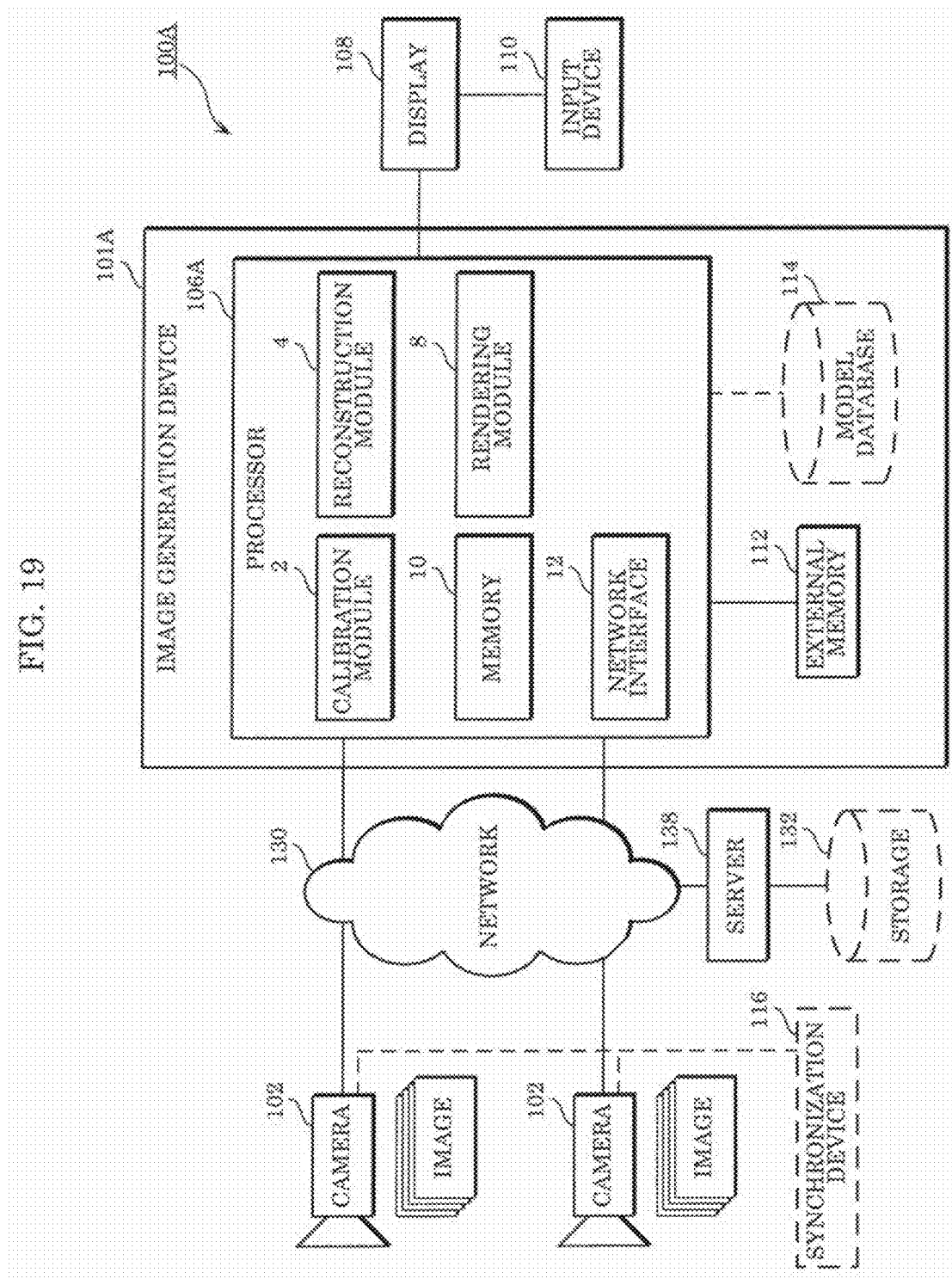
FIG. 19 is a block diagram illustrating an example of the configuration of an image generation system according to a variation.

In the above embodiments, image generation system 100 is configured so that the plurality of images captured by the plurality of cameras 102 are output to image generation device 101 via the plurality of image-capturing devices 104, but this is not limiting. For example, it is possible to apply a configuration such as that of image generation system 100A illustrated in FIG. 19 in which the plurality of images captured by the plurality of cameras 102 are output to image generation device 101A via network 130. In this case, the plurality of images may be temporarily accumulated in storage 132 of server 138 via network 130. Image generation device 101A may be configured to obtain, via network interface 12 of processor 106A, the plurality of images accumulated in storage 132 of server 138.

Such view-dependent synthesis is useful in a wide range of applications including the medical industry, the film industry, the video game industry, the building industry, the scientific community and the engineering community.

The above-described view-dependent synthesis requires practical rendering and high image quality that minimize visual discomfort. Furthermore, a method for handling visibility, occlusion, and a difference in color or luminance is needed.

In the above embodiments, at least one of the luminance adjustment for adjusting a difference in luminance or the color adjustment for adjusting a difference in color is performed in the adjustment process, but luminance adjustment for adjusting a luminance component or chrominance adjustment for adjusting a chrominance component are performed as the adjustment process. The adjustment process may be the color adjustment alone in the case of adjusting the value of RGB. Alternatively, the adjustment process may be the luminance adjustment alone.

Although the present disclosure is described based on the above embodiments, it goes without saying that the present disclosure is not limited to the above embodiments. The following cases are also included in the present disclosure.

(1) The respective devices described above may be specifically configured as a computer system made up of a microprocessor, a read only memory (ROM), a random access memory (RAM), a hard disk unit, a display unit, a keyboard, a mouse, and so on. A computer program is stored in the RAM or the hard disk unit. The respective devices achieve their functions by way of the microprocessor operating according to the computer program. Here, the computer program is configured of a combination of a plurality of command codes indicating instructions to a computer in order to achieve a predetermined function.

(2) Some or all of the structural elements included in each of the above-described devices may be one system LSI (Large Scale Integration: large scale integrated circuit). The system LSI is a super multifunctional LSI manufactured by integrating a plurality of components onto a signal chip. Specifically, the system LSI is a computer system configured of a microprocessor, a ROM, a RAM, and so on. A computer program is stored in the ROM. The system LSI achieves its function by way of the microprocessor loading the computer program from the ROM into the RAM and performing operations such as calculations according to the computer program.

(3) Some or all of the structural elements included in each of the above-described devices may be implemented as a standalone module or an IC card that can be inserted into and removed from the corresponding device. The IC card or the module is a computer system made up of a microprocessor, a ROM, a RAM, and so on. The IC card or the module may include the aforementioned super multifunctional LSI. The IC card or the module achieves its functions by way of the microprocessor operating according to the computer program. The IC card and the module may be tamperproof.

(4) The present disclosure may be implemented as the above-described methods. Furthermore, the present disclosure may be implemented as a computer program for implementing these methods using a computer or may be a digital signal of the computer program.

Furthermore, the present disclosure may be implemented as a computer program or a digital signal recorded on a computer-readable recording medium, such as a flexible disk, a hard disk, a compact disc (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be implemented as a digital signal recorded on the aforementioned recoding media.

Furthermore, in the present disclosure, the computer program or the digital signal may be transmitted via an electrical communication line, a wireless or wired communication line, a network represented by the Internet, data broadcasting, or the like.

Furthermore, the present disclosure may be a computer system including a microprocessor and a memory. The memory may store the computer program and the microprocessor may operate according to the computer program.

Moreover, by transferring the recording medium having the program or the digital signal recorded thereon or by transferring the program or the digital signal via the network or the like, the present disclosure may be implemented by a different independent computer system.

(5) The above embodiments and the above variation may be combined with each other.

Note that in the above embodiments, each of the structural elements may be configured in the form of an exclusive hardware product or may be implemented by executing a software program suitable for the structural element. Each of the structural elements may be implemented by a program executing unit such as a central processing unit (CPU) or a processor reading and executing the software program recorded on a recording medium such as a hard disk or a semiconductor memory. Here, software for realizing the image generation method and the image generation device, etc., according to the above embodiments is a program described below.

Specifically, this program causes a computer to execute an image generation method for generating a virtual image by a processor using at least one image among a plurality of images obtained by a plurality of cameras disposed in different positions and attitudes capturing a same target space in a three-dimensional (3D) space. The virtual image is a two-dimensional (2D) image of the target space viewed from a virtual viewpoint in the 3D space. The image generation method includes receiving one or more second images from the plurality of cameras. The image generation method includes performing a second process on the one or more second images to generate the virtual image when generating the virtual image using the one or more second images. The second process includes at least one of luminance adjustment or color adjustment and is different from a first process performed to generate the virtual image using one or more first images serving as a basis among the plurality of images. The one or more second images are captured by one or more second cameras, at least one of which is different from one or more first cameras that capture the one or more first images.

Although the image generation method and the image generation device according to one or more aspects of the present disclosure have been described thus far based on the embodiments, the present disclosure is not limited to the above-described embodiments. Various modifications of the present embodiments as well as embodiments resulting from combinations of structural elements in different exemplary embodiments that may be conceived by a person having ordinary skill in the art are intended to be included within the scope of the present disclosure as long as these do not depart from the essence of the present disclosure.

INDUSTRIAL APPLICABILITY

The present disclosure can be used advantageously in 3D rendering devices and methods.

What is claimed is:

1. An image generation method for generating a virtual image by a processor using at least one image among a plurality of images obtained by a plurality of cameras disposed in different positions and attitudes capturing a same target space in a three-dimensional (3D) space, the virtual image being a two-dimensional (2D) image of the target space viewed from a virtual viewpoint in the 3D space, the method comprising:

receiving one or more second images from the plurality of cameras;
performing a second process on the one or more second images to generate the virtual image when generating the virtual image using the one or more second images, the second process including at least one of luminance adjustment or color adjustment and being different from a first process performed to generate the virtual image using one or more first images serving as a basis among the plurality of images, the one or more second images being captured by one or more second cameras, at least one of which is different from one or more first cameras that capture the one or more first images;
the generating of the virtual image includes:
generating a first region of the virtual image by performing the first process on the one or more first images; and
generating a second region of the virtual image by performing the second process on the one or more second images, the second region not overlapping the first region; and
the generating of the virtual image further includes:
obtaining a 3D model of the target space;
selecting a plurality of candidate points for generating the virtual image from among a plurality of 3D points constituting the 3D model; and
extracting, from the plurality of cameras, cameras that capture respective ones of the plurality of candidate points,
in the generating of the first region, when all of the one or more first cameras are included in the cameras extracted for the respective ones of the plurality of candidate points, the first process is performed on regions of the one or more first images to generate the first region of the virtual image, the regions corresponding to the plurality of candidate points, the first region corresponding to the plurality of candidate points, and
in the generating of the second region, when at least one of the one or more first cameras is not included in the cameras extracted for the respective ones of the plurality of candidate points, the second process is performed on pixels of the one or more second images to generate the second region of the virtual image, the pixels corresponding to the plurality of candidate points, the one or more second images being captured by the one or more second cameras included in the cameras extracted, the second region corresponding to the plurality of candidate points.

2. The image generation method according to claim 1, wherein
the same target space includes a flat face,
each of the one or more first images and the one or more second images includes an image of the flat face,
in the first process, a region of the virtual image is generated by projective transformation of the one or more first images, the region corresponding to the flat face, and
in the second process, a region of the virtual image is generated by projective transformation of the one or more second images, the region corresponding to the flat face.

3. The image generation method according to claim 1, wherein
the one or more first cameras are two cameras located nearest to the virtual viewpoint among the plurality of cameras.

4. An image generation method for generating a virtual image by a processor using at least one image among a plurality of images obtained by a plurality of cameras disposed in different positions and attitudes capturing a same target space in a three-dimensional (3D) space, the virtual image being a two-dimensional (2D) image of the target space viewed from a virtual viewpoint in the 3D space, the method comprising:

receiving one or more second images from the plurality of cameras; and performing a second process on the one or more second images to generate the virtual image when generating the virtual image using the one or more second images, the second process including at least one of luminance adjustment or color adjustment and being different from a first process performed to generate the virtual image using one or more first images serving as a basis among the plurality of images, the one or more second images being captured by one or more second cameras, at least one of which is different from one or more first cameras that capture the one or more first images, wherein the one or more first cameras are two or more first cameras, the first process includes a process of blending, at a predetermined blending ratio, at least one of luminance or colors of two or more first images captured by the two or more first cameras, and the second process includes a process of performing at least one of the luminance adjustment or the color adjustment to obtain one of luminance and a color that is similar to a corresponding one of luminance and a color obtained by the process of blending, using a difference in at least one of luminance or a color obtained by comparing two or more first background images obtained by the two or more first cameras and one or more second background images obtained by the one or more second cameras.

5. An image generation device which generates a virtual image using at least one image among a plurality of images obtained by a plurality of cameras disposed in different positions and attitudes capturing a same target space in a three-dimensional (3D) space, the virtual image being a two-dimensional (2D) image of the target space viewed from a virtual viewpoint in the 3D space, the device comprising:

a memory; and a processor which performs a second process on one or more second images to generate the virtual image when generating the virtual image using the one or more second images, the second process including at least one of luminance adjustment or color adjustment and being different from a first process performed to generate the virtual image using one or more first images serving as a basis among the plurality of images, the one or more second images being captured by one or more second cameras, at least one of which is different from one or more first cameras that capture the one or more first images; and the one or more first cameras are two or more first cameras, the first process includes a process of blending, at a predetermined blending ratio, at least one of luminance or colors of two or more first images captured by the two or more first cameras, and the second process includes a process of performing at least one of the luminance adjustment or the color adjustment to obtain one of luminance and a color that is similar to a corresponding one of luminance and a color obtained by the process of blending, using a difference in at least one of luminance or a color obtained by comparing two or more first background images obtained by the two or more first cameras and one or more second background images obtained by the one or more second cameras.

6. An image generation method for generating a virtual image viewed from a virtual viewpoint, the image generation method comprising:

obtaining a three-dimensional (3D) model of a subject;

controlling at least one camera to shoot the subject from viewpoints to generate respective images, the images including a first image and a second image;

projecting a 3D point of the 3D model onto the first image and the second image;

determining whether the 3D point projected is visible on both of the first image and the second image;

compositing the first image and the second image to generate a first texture if the 3D point projected is determined to be visible on both of the first image and the second image, the first texture showing the 3D point in the virtual image;

obtaining a third image from among the images and projecting the 3D point onto the third image such that the 3D point is visible on the third image if the 3D point projected is determined to be invisible on both of the first image and the second image; and performing at least one of luminance adjustment or color adjustment on the third image based on the first image and the second image to generate a second texture, the second texture if the third image is obtained, showing the 3D point in the virtual image.

* * * * *